United States Patent [19]

Fabian et al.

[11] Patent Number: 4,828,770
[45] Date of Patent: May 9, 1989

[54] EXTRUSION SYSTEM

[75] Inventors: Ellis Fabian, N. York Ontario; Enno E. Agur, Mississauga, both of Canada

[73] Assignee: Xerox Corporation, Stamford, Conn.

[21] Appl. No.: 110,597

[22] Filed: Oct. 16, 1987

Related U.S. Application Data

[63] Continuation of Ser. No. 813,191, Dec. 24, 1985, abandoned.

[51] Int. Cl.$^4$ .................. B29C 47/88; B29C 55/28; B29D 23/22
[52] U.S. Cl. .................. 264/40.3; 264/23; 264/209.4; 264/565; 264/568; 425/72.1; 425/174.2; 425/326.1
[58] Field of Search ............... 264/209.3, 209.4, 209.5, 264/23, 565, 566, 569, 568, 40.3, 563; 425/72 R, 326.1, 379 R, 174, 174.2

[56] References Cited

U.S. PATENT DOCUMENTS

| | | | |
|---|---|---|---|
| 2,519,375 | 2/1946 | Jarastorff et al. | 264/558 |
| 2,966,700 | 1/1961 | Dyer et al. | 425/326.1 |
| 2,994,923 | 8/1961 | Eddy . | |
| 3,061,875 | 11/1962 | Gerow | 264/563 |
| 3,084,386 | 4/1963 | Gerow | 264/209.5 |
| 3,085,290 | 4/1963 | Chu . | |
| 3,142,865 | 8/1964 | Richie et al. | 264/563 |
| 3,171,696 | 7/1961 | Houghton | 308/1 |
| 3,246,055 | 4/1966 | Pendleton | 425/174.2 |
| 3,246,055 | 8/1962 | Pendleton | 264/23 |
| 3,300,555 | 1/1967 | Bild et al. | 264/95 |
| 3,376,181 | 4/1968 | Larson et al. | 156/203 |
| 3,447,480 | 5/1965 | Bodine, Jr. | 164/49 |
| 3,553,303 | 1/1971 | Zavasnik | 264/150 |
| 3,576,051 | 4/1971 | Click . | |
| 3,577,489 | 5/1971 | Bigland | 425/72 R |
| 3,671,617 | 6/1972 | Nagase | 264/89 |
| 3,725,519 | 3/1973 | Seifried et al. | 264/25 |
| 3,742,105 | 6/1973 | Kureda | 264/89 |
| 3,775,523 | 11/1973 | Haley | 264/89 |
| 3,819,790 | 12/1969 | North et al. | 264/89 |
| 3,835,209 | 9/1974 | Karabedian | 425/326.1 |
| 3,871,802 | 3/1975 | Blackwelder | 425/72 R |
| 3,891,374 | 6/1975 | Ninomiya et al. | 425/326.1 |
| 3,944,641 | 3/1976 | Lemelson | 264/70 |
| 4,009,975 | 3/1977 | Ninomiya et al. | 425/72 R |
| 4,049,768 | 9/1977 | Luthra | 264/209.3 |
| 4,062,916 | 12/1977 | Skilling | 264/95 |
| 4,118,453 | 10/1978 | Herrington | 264/89 |
| 4,258,113 | 3/1981 | Kuehnle | 430/94 |
| 4,270,891 | 6/1981 | Hooper | 425/296 |
| 4,341,729 | 7/1982 | Hayashi et al. | 264/566 |
| 4,494,433 | 1/1985 | Gerber | 83/374 |
| 4,536,365 | 8/1985 | Zwick | 264/558 |
| 4,698,196 | 10/1987 | Fabian | 264/565 |

FOREIGN PATENT DOCUMENTS

| | | | |
|---|---|---|---|
| 153610 | 5/1952 | Australia | 264/565 |
| 711163 | 6/1985 | Canada . | |
| 2232776 | 1/1974 | Fed. Rep. of Germany | 425/379 R |
| 71169 | 6/1978 | Japan | 264/565 |
| 7705659 | 7/1978 | Netherlands . | |
| 823228 | 11/1959 | United Kingdom . | |

OTHER PUBLICATIONS

Japanese Patent Document, 1981-46,729, Showa Denko KK.
Plastics Extrusion Technology and Theory, G. Schenkel.
G. R. Dawson, "10.3 Ultrasonic Radial Die Ascillations in Floating Plug Tuber Drawing".

Primary Examiner—Robert L. Spruill

[57] ABSTRACT

Apparatus for extruding a pliable, thin-walled tube comprising an extrusion and shaping die assembly comprising an annular die body, a mandrel supported within the annular die body, a mandrel extension mounted on the mandrel adjacent the die outlet, the mandrel extension having a diameter less than the diameter of the mandrel, a sizing disk supported by the mandrel extension, and a source capable of supplying molten polymeric material to the die assembly under pressure to force the material through an annular extrusion flow channel around the mandrel and out the die outlet thereby forming a moving tube of the material, the mandrel extension extending outwardly from the die in the direction in which the tube is extruded, the annular die body having at least one fluid passageway to channel fluid introduced under pressure into the annular die body axially through the mandrel and outwardly from the axis of the mandrel extension to form an air pillow adapted to cool and support the tube around and spaced from the mandrel extension, and the sizing disk being adapted to restrict escape of the fluid and to define a chamber in cooperation with the tube of the molten polymeric material for confining the air pillow around the mandrel extension. This apparatus may be employed in a process to prepare a pliable, thin-walled tube.

14 Claims, 11 Drawing Sheets

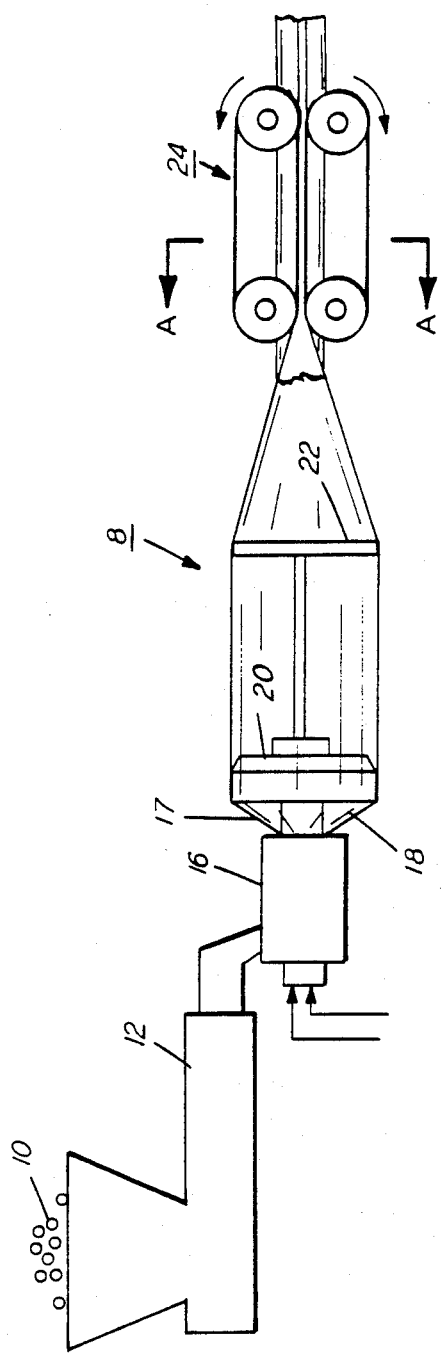
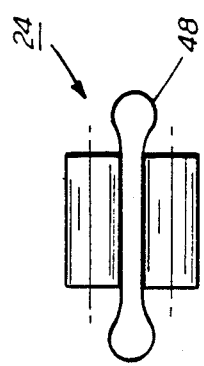
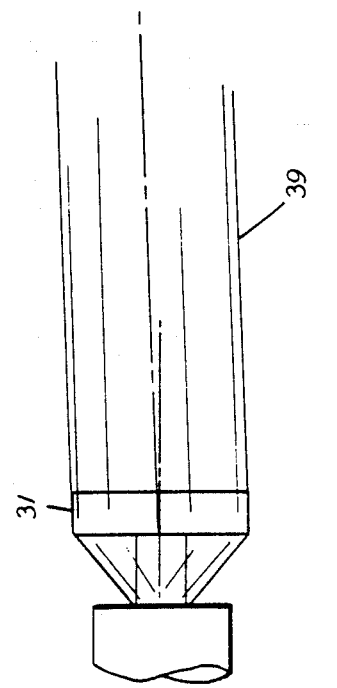
FIG. 1
FIG. 3
FIG. 4

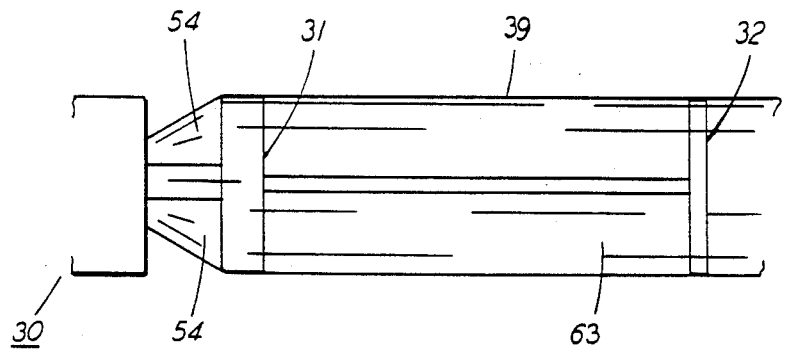
FIG. 5
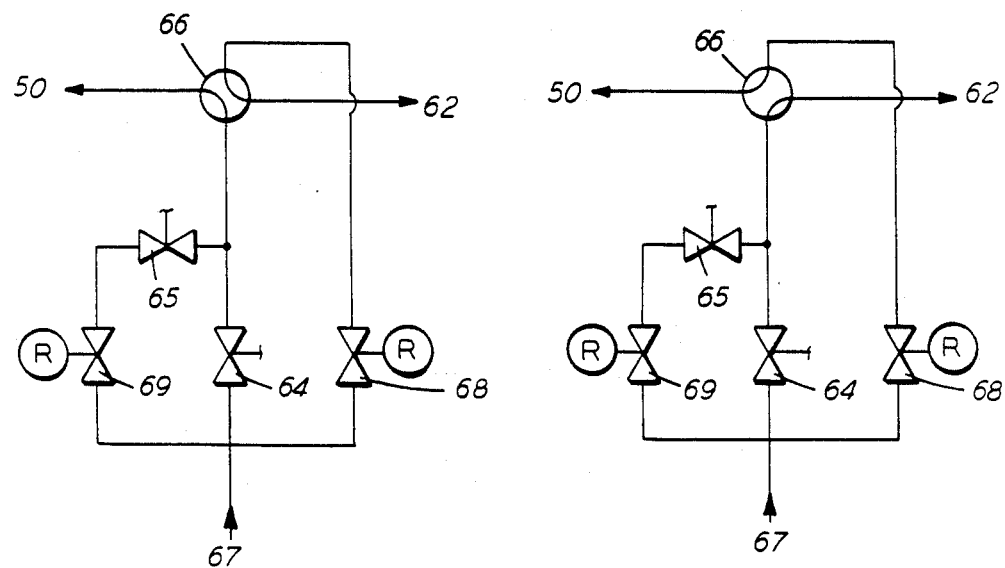
FIG. 6
FIG. 7

EXTRUSION SYSTEM

This is a continuation of application Ser. No. 813,191, filed Dec. 14, 1985, now abandoned.

BACKGROUND OF THE INVENTION

This invention relates in general to extrusion and, more specifically, to novel apparatus and processes for fabricating seamless tubes including thin-walled, large diameter tubes.

In the art of extruding thin-walled, large diameter polymer tubes from an annular orifice, air is introduced into the hot tubing as it emerges from the extruder to prevent collapse of the tubing walls while the thermoplastic material is cooling and solidifying. The molten polymer tube, if unsupported, tends to sag and deform under its own weight with bonding occurring at any point of contact with itself or with adjacent surfaces of the extrusion apparatus. In the blown film extrusion technique, the tube is also expanded by the internal air pressure. The formed tubing is thereafter recovered by passing it between pinch rollers which flatten the tubing. The flattened tubing may subsequently be transported to a suitable device for rolling the flattened tubing for further processing in a device such as a bag making machine.

Although thermoplastic film tubing has been manufactured commercially, difficulties have been experienced in preparing thin-walled, large-diameter, pliable tubes having precise dimensional uniformity in wall thickness, tube diameter and conicity which would satisfy high tolerance requirements. Techniques for forming thermoplastic tubes for garbage bags such as by blown extrusion are generally inadequate for devices that must meet high dimensional standards. For exmaple, electrostatographic members such as photoreceptor substrates for use in sophisticated high speed electrophotographic copiers, duplicators and printers must have a uniform thickness and diameter so that the photoconductive layers thereon are maintained at precise distances from optical exposure devices, charging devices, cleaning devices and image transfer stations. Thus, these distances must be uniform across the width and along the circumference of the photoreceptor belt and be free of any imperfections such as creases. In addition, high speed electrophotographic copiers, duplicators and printers require belts having a uniform conicity, i.e. uniformity of diameter from one side of the belt to the other, to insure proper belt support and tracking, particularly during extended high speed runs. Moreover, reproducibility of the diameter of a photoreceptor belt is necessary to insure proper fit on the belt support drive systems of modern electrophotographic copiers, duplicators and printers.

In the blown film extrusion process, the type of pinch rollers utilized to maintain the pressure of the internal air in the blown tube causes two diametrically opposite permanent creases to form in the tubing running parallel to the tube axis. These permanent creases render blown film extrusion belts unsuitable for modern high speed electrophotographic imaging systems because the creses interfere with charging, exposure, development, transfer and cleaning.

Various techniques utilizing internal and external sizing mechanisms have been developed for producing tubular films. For example, an internal mandrel process and apparatus for the production of oriented tubular film is disclosed in U.S. Pat. No. 4,062,916 to Skilling in which rupture of the extruded tube by the pressure of inflating gas is prevented by means of a cup seal located between the mandrel and inflating zone, the cup seal being in peripheral engagement with the internal surface of the tube and presenting a substantially concave surface on the mandrel. The requirement for a cup seal and a protruding lip on the seal totally prevents leakage past the seal. In order to properly function as a seal, the seal must be resilient. Moreover, the seal does not perform a sizing function as seen, for example, In FIG. 1 of U.S. Pat. No. 4,062,916 where the extruder tube is relatively thick at the seal and is subsequently blown into a large diameter thin-walled tube elsewhere down the production line.

In U.S. Pat. No. 3,818,790 to North et al, a thermoplastic resin is extruded through a ring die to form a tubular film when the film is partially cooled by means of a cooling gas before the tube is drawn over a cooling mandrel, the improvement being the use of multi-stepped adjustable rings to direct a cooling gas onto the external surface of the film between the die gap and mandrel, thus defining a series of orifices between the rings and the film to effect a gradient in pressure from the die to the mandrel. Static air pressure is employed on both sides of the mandrel to inflate the film bubble.

In Japanese Patent Application No. 1974-122,555 to Showa Denko, filed Sept. 26, 1979, an internal stabilizing device forming film bubbles is disclosed in which a number of disks are arranged coaxially on a solid shaft. The extruded film is drawn inwardly toward the spaces between adjacent disks supported on a solid rod. Thus, the contact pressure of the tubular film against the multiple disks is increased to stabilize the film. The tubular film is thereafter formed into a large diameter film bubble. According to this patent application, a single disk unit by itself is ineffective.

Another technique for forming thermoplastic tubing is disclosed in U.S. Pat. No. 2,519,375 to Jargstorff et al. The technique disclosed involves an external cooling die and does not employ a sizing disk or hollow mandrel. A stagnant gas pocket is utilized to expand the hot plastic tubing against the internal surface of the cooling die. The tube is bent to permit the formation of a liquid seal to maintain the stagnant gas pocket.

An external cooling ring is also described in U.S. Pat. No. 4,341,729 to Hayashi et al. The external cooling ring is used as a suction ring which simultaneously sucks air used for heating the stretched upstream section of a tubular film and air used for cooling the downstream section of the tubular film. No sizing disk or hollow mandrel are disclosed.

In Plastic Extrusion Technology and Theory, G. Schenkel, Transl. by L. E. H. Eastman, B. S. Clyde, Ed., Lliffe Books Ltd., London, American Elsevier, New York, p. 322, apparatus is shown in which a thin-walled tube is extruded over a water-cooled sizing disk. It appears that air is channeled through the die and sizing disk and introduced downstream of the sizing disk in FIG. 11.2 (b). This introduction of air downstream through the sizing disk renders difficult adequate control of the pressure in the chamber between the die and sizing disk.

Accordingly, there continues to be a need for an improved and more effective system for forming seamless, thin-walled, creaseless belts having wall thicknesses and tube diameters which satisfy high tolerance standards, particularly for tubes meeting the demanding dimensional uniformity requirements of modern, precision, high speed electrostatographic imaging systems.

SUMMARY OF THE INVENTION

It is an object of this invention to provide an extrusion system for forming thin-walled, large-diameter, seamless and creaseless belts.

It is another object of this invention to provide an extrusion system for producing belts having uniform wall thickness.

It is another object of this invention to provide an extrusion system that permits precise control of the belt diameter.

It is another object of this invention to provide an extrusion system which forms belts meeting narrow conicity tolerances.

The foregoing objects and others are accomplished in accordance with this invention by providing an extrusion apparatus for extruding pliable, thin-walled tubes comprising an extrusion and shaping die assembly comprising an annular die body, a mandrel supported within the annular die body, the die body and mandrel cooperating to form a die annulus, a mandrel extension, at least one annular sizing disk supported by the mandrel extension, and means to supply molten polymeric material to the die assembly under pressure to force the material through the die body around the mandrel and out the die annulus thereby forming a moving tube of the material, the annular die body having at least one fluid passageway to channel fluid introduced under pressure into the annular die body through the mandrel and outwardly from the axis of the mandrel extension to form an air pillow adapted to cool and support the tube around and spaced from the extension and support, and the sizing disk being adapted to restrict escape of the fluid and to define a chamber in cooperation with the tube of the molten polymeric material for confining the air pillow around the mandrel extension. A process is also contemplated for extruding a pliable, thin-walled tube comprising extruding a molten polymeric material through an annular opening of a shaping die to form a moving polymeric tube circumferentially surrounding and spaced from a central mandrel die extension extending outwardly from the shaping die in the direction in which the tube is extruded, pulling the moving plastic tube over at least one sizing disk spaced from the annular opening and introducing a gas under pressure outwardly away from the axis of the mandrel extension to expand and cool the tube and maintain the tube spaced from the mandrel extension.

BRIEF DESCRIPTION OF THE DRAWINGS

The advantages of this improved apparatus and process will become more apparent upon a consideration of the following detailed disclosure of the invention, particularly when taken in conjunction with the accompanying figures wherein:

FIG. 1 is a schematic sectional view in elevation of a thermoplastic tube extrusion apparatus embodying features of the present invention.

FIG. 3 is a sectional view along line AA of FIG. 1.

FIG. 4 is a schematic sectional view of an extrusion and shaping die assembly without a stabilizing disk.

FIG. 5 is a schematic sectional view of an extrusion and shaping die assembly with a stabilizing disk.

FIG. 6 is a schematic diagram of an air distribution system in one mode of opeation for the extrusion system of the present invention.

FIG. 7 is a schematic diagram of an air distribution system in another mode of operation for the extrusion system of the present invention.

Figures 2, 2A:
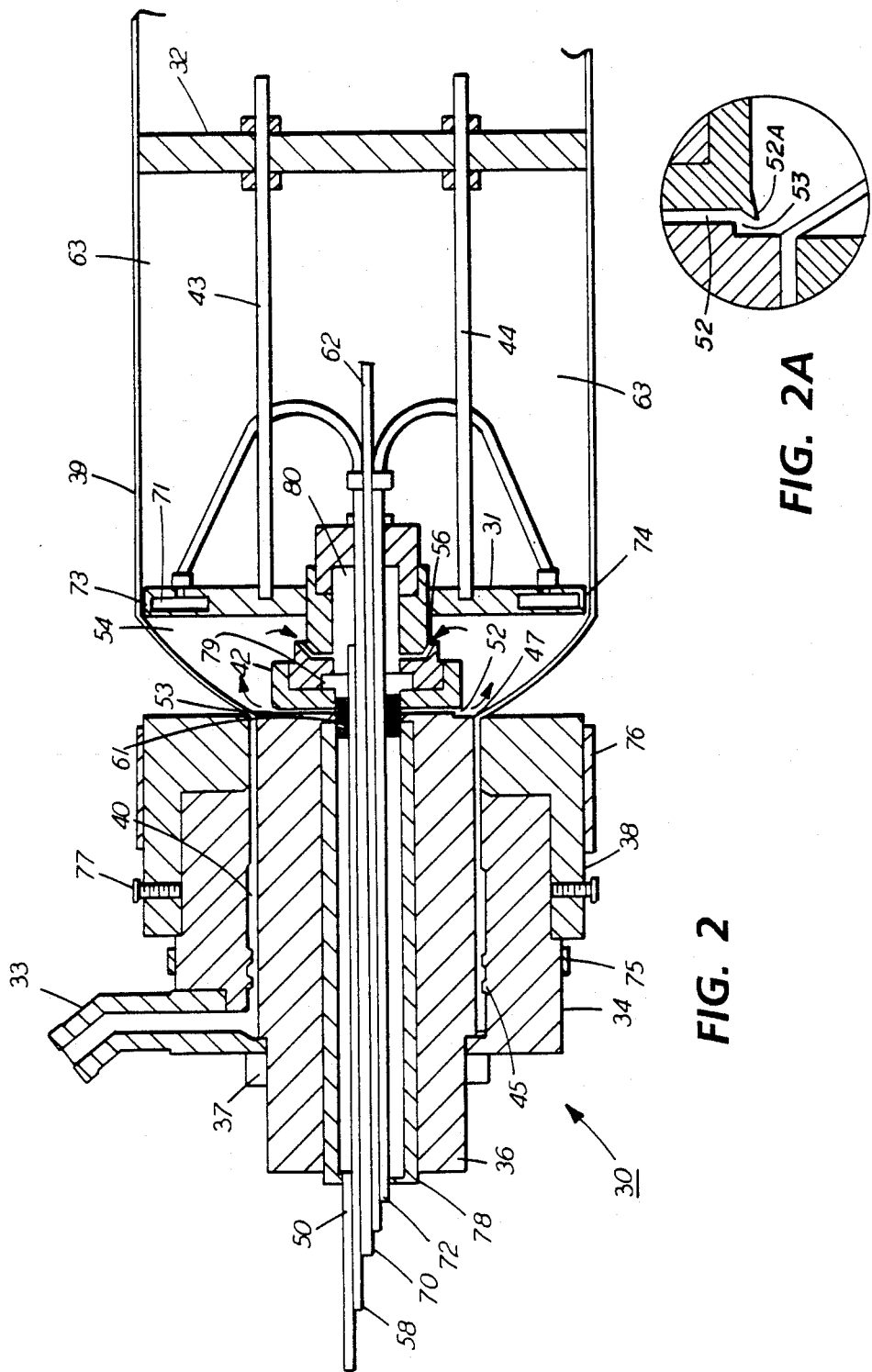
FIG. 2 is a schematic sectional view of one embodiment of an extrusion and shaping die assembly of the present invention.

These figures merely schematically illustrate the invention and are not intended to indicate relative size and dimensions of actual extrusion systems or components thereof.

While the present invention will hereinafter be described in connection with the preferred embodiments and methods of use thereof, it will be understood that it is not intended to limit the invention to these embodiments and methods of use. On the contrary, it is intended to cover all alternatives, modifications and equivalents as may be included within the spirit and scope of the invention as defined in the appended claims.

For a general understanding of the features of the present invention, reference is made to the drawings.

A thin film extrusion apparatus 8 is illustrated in FIG. 1. Thermoplastic polymer pellets 10, such as nylon, polyethylene terephthalate, polypropylene or the like, are fed to a conventional extruder 12, such as a single or multiple-screw extruder or other suitable device such as a melt pump (not shown), using a gravity feed hopper or other suitable powered or gravity feeder. If desired, the polymer pellets may be dried to remove any volatiles by predrying or by any suitable on-line device such as a desiccant hopper dryer. The polymer pellets 10 are melted in the extruder 12 and the molten polymer is pumped by the extruder 12 through an annular thin-film extrusion die 16. The resulting extruded tubular film 17 is pulled through expansion zone 18, stretched over sizing disk 20, pulled over stabilizing disk 22 and pulled away and processed downstream from stabilizing disk 22 by tubular film puller 24. The side of extruded tubular film 17 facing the viewer is not shown in order to more clearly illustrate the sizing disk 20, stabilizing disk 22 and tubular film puller 24.

Referring to FIG. 2, a cross-head extrusion die 30 is illustrated which may be used as the extrusion die 16 of the extrusion system shown FIG. 1. This cross-head extrusion die 30 is coupled to a sizing disk 31 and stabilizing disk 32. The cross-head extrusion die 30 comprises a die adapter 33 coupled to an annular die body 34 which encircles a die mandrel 36. The die mandrel 36 is secured to the annular die body 34 by a lock nut 37 threaded on to die mandrel 36. Mounted to the annular die body 34 is an annular adjustable die face 38 which also encircles the die mandrel 36. The adjustable die face 38 allows adjustment of the die gap to compensate for film thickness variations around the circumference of the extruded tubular film 39. Annular die body 34 and annular adjustable die face 38 are spaced from die mandrel 36 and coopeate therewith to form an annular extrusion flow channel 40. A mandrel extension 42 couples sizing disk 31 to die mandrel 36. Support rods 43 and 44 or other suitable support means secure stabilizing disk 32 to sizing disk 31. Although the illustration in FIG. 1 and other Figs. described hereinafter depict apparatus in which the extruded tubular film is extruded in a horizontal direction, other alignments such as extrusion in a vertical direction may be effected if desired.

In operation, a molten thermoplastic material from an extruder, such as the extruder 12 shown in FIG. 1, is pumped into die adapter 33 of crosshead extrusion die 30, through annular extrusion flow channel 40 optionally containing choke ridges 45 (flow restrictors) and out die outlet 47 to form an extruded tubular film 39. The choke ridges 45 minimize the effect of weld line formation due to flow separation at the entrance to the annular extrusion flow channel 40. If desired, the choke ridges may be located on the die mandrel 36 as an alternative to or in addition to positioning of the choke ridges 45 on the inside annular surface of annular die body 34. Generally, the number, size and shape of any choke ridges employed should be selected so as to maintain the pressure within the extrusion die below the maximum pressure capacity of the extruder and extrusion die. Choke ridges are not normally employed for polymers that hang up and unduly thermally degrade. The extruder supplies the molten thermoplastic material to the cross-head extrusion die 30 under sufficient pressure to force the molten thermoplastic material through annular extrusion flow channel 40 and out the die outlet 47. Typical extruders include the the ZSK-30 twin-screw extruder with a maximum pressure rating of about 2,600 psi (17,900 kPa) and single-screw extruders which can develop pressures on the order of about 10,000 psi (68,900 kPa). Extruded tubular film 39 is pulled over sizing disk 31 and stabilizing disk 32 by a suitable tube puller, such as the tube puller 24 illustrated in FIGS. 1 and 3. In the sectional view shown in FIG. 3, the extruded tubular film 39 is contacted by the tube puller 24 in a flattened region extending longitudinal along the extruded tubular film 39 and segments 48 having a light bulb shaped cross section extend out from each side of tube puller 24. Since the segments 48 are not flattened, no creases are formed along the sides of extruded tubular film 39.

Without downstream stabilization such as effected by stabilizing disk 32, it is possible for extruded tubular film 39 to not be coaxial with sizing disk 31 as shown in FIG. 4. If the axis of the extruded tubular film 39 moves during operation, the circumference of extruded tubular film 39 can change resulting in the final product having circumference variations along its axis which can easily exceed required tolerances for applications requiring a high degree of precision. Even if tube segments have identical circumferences, their cross-sectional center points will not be colinear. Thus, a stabilizing disk 32 is preferred to maintain coaxial alignment between extruded tubular film 39 and sizing disk 31 as illustrated in FIG. 5. Further, the stabilizing disk prevents downstream disturbances (such as vibrations or cutting influences) from being felt upstream especially in the melt bubble in the expansion zone 54. Without a stabilizing disk vibrations or cuts downstream cause circumferential rings to form in the extruded tubular film 39 at the leading edge of the sizing disk 31.

Referring again to FIG. 2, pressurized air or other suitable fluid is supplied through air line 50, into at least two air channels 52, and through at least one recess 53 outwardly from the axis of the mandrel extension 42 to provide an air pillow within expansion zone 54 for expanding and supporting extruded tubular film 39 circumferentially surrounding the mandrel extension 42 as it emerges from die outlet 47 and is pulled over sizing disk 31 which has a larger diameter than die mandrel 36. The use of a larger diameter reduces the likelihood of contact and adhesion of the molten polymer to the mandrel extension 42 during start up, enhances the maintainanace of a gas tight seal between the flexible tube and the sizing disk 31, and provides a more cost effective means for preparing large diameter flexible tubes without costly dies having large diameter mandrels. Also, such a die permits a small diameter annulus having a large gap rather than requiring a large diameter annulus with small gap and, hence requiring exceedingly high operating pressures. Depending upon the relative diameters of die mandrel 36 and mandrel extension 42, recess 53 may comprise a series of recess segments instead of a continuous groove or even be eliminated. For example, a continuous groove is necessary when the diameter of mandrel extension 42 approaches that of die mandrel 36 such that a segmented groove cannot provide a sufficient film of air to prevent extruded tubular film 39 from contacting and adhering to mandrel extension 42. In other words, the diameter of mandrel extension 42 in the region adjacent the junction of the mandrel extension 42 and die mandrel 36 must always be smaller than the diameter of die mandrel 36 in order to space the extruded tubular film material film from the mandrel extension 42 to prevent contact and sticking of the extruded tubular film material to the mandrel extension 42 during start up. The difference in diameter and the minimum distance the region must extend axially downstream from the junction of the mandrel extension 42 and die mandrel 36 depends upon the specific materials, temperature, air velocity in channels 52 and other variables employed. Contact and sticking of the extruded tubular material tothe mandrel extension during start up has always been encountered when the diameter of mandrel extension 42 in the region immediately adjacent the junction of the mandrel extension 42 and die mandrel 36 was equal to the diameter of die mandrel 36. Satisfactory results during startup have been achieved with mandrel extensions having a radius from ⅛ inch to about ¾ inch shorter than the radius of the mandrel, the shorter radius region extending from about ⅜ inch to about ½ inch axially downstream from the junction of the mandrel extension 42 and die mandrel 36. These dimensions are for purposes of illustration and other values outside these ranges may be utilized depending upon the specific materials and other conditions utilized. In any event, the diameter of the mandrel extension should be sufficiently smaller than the diameter of the mandrel to prevent contact and sticking of the extruded tubular material to the mandrel extension during start up. Moreover, it should also be kept in mind that the diameter of the mandrel extension should also be large enough to permit housing of the service lines that supply any fluids, electricity, etc. to components downstream of the mandrel. The distribution of the air channels 52 and air pressures need not be uniform along the recess 53. Moreover, the air channels 52 may be perpendicular to or at any suitable acute or obtuse angle to the axis of mandrel extension 42. If desired, the outlets of air channels 52 may be baffled, e.g. by a lip (not shown) on one side of recess 53 which overhangs the outlets of air channels 52, thereby deflecting the path of air streams as they enter expansion zone 54 from the outlets of air inlet channels 52. The recess 53 in mandrel extension 42 serves to diffuse and control the air velocity. Moreover, as indicated previously, it also facilitates start up of the extrusion process by preventing the extruded tubular film 39 from adhering to mandrel extension 42 as it initially emerges from the die outlet 47 and is manually pulled over the sizing disk 31 and stabilizing disk 32. Air from the expansion zone 54 is allowed to exit the cross-head extrusion die 30 through air exhaust channels 56 and air line 58. It is preferred that air exhaust channels 56 are angled away from die outlet 47 to prevent accidental plugging by molten polymer during startup, shutdown and the like. The air supplied to the expansion zone 54 serves to expand, cool or heat, and provide physical support in the form of an air pillow for the extruded tubular film 39 and to maintain spacing between the extruded film 39 and mandrel extension 42 as shown in FIGS. 2 and 5. The air supplied to the expansion zone 54 is prevented from exiting between the extruded tubular film 39 and peripheral surface 60 of sizing disk 31 by the tight seal between the extruded tubular film 39 and peripheral surface 60 of sizing disk 31. This prevents the product tube 39 from assuming a non-concentric configuration relative to the sizing disk 31. Prior to introducing air from air line 50 into inlet channels 52, the air is passed through a baffle 61 to diffuse and control the air velocity thereby minimizing the formation of local nonuniform patterns and strong air currents in the air pillow formed in expansion zone 54. The baffle 61 may comprise, for example, organic or inorganic fibers such as brass wool. Pressurized air or other suitable gas such as nitrogen is supplied through air line 62 into stabilization zone 63 between sizing disk 31 and stabilizing disk 32 to stabilize and prevent collapse of extruded tubular film 39 as it is pulled past the sizing disk 31. The air inlet to stabilization zone 63 may simply be via a single tube such as air line 62. In light of the tight circumference tolerances required for the final extruded tubular film 39, it is beneficial to independently control the air pressures in expansion zone 54 and stabilization zone 63 during operation. During startup, much higher air pressure is needed in expansion zone 54, but when extruded tubular film 39 is first closed over sizing disk 31, the air pressure must be reduced immediately or else extruded tubular film 39 will burst. To facilitate this operational change over and to control the air pressures in expansion zone 54 and stabilization zone 63, an air distribution system, such as illustrated in FIGS. 5, 6 and 7 may be utilized. This air distribution system operates in three modes. In the starting up mode illustrated in FIG. 6, valve 64 is open, valve 65 is closed, and four-way valve 66 is set so that most of the air from air inlet line 67 flows to air line 50 and into expansion zone 54 (see also FIGS. 2 and 5). When extruded tubular film 39 has been closed over sizing disk 31, fourway valve 66 is switched, as shown in FIG. 7, to so that air flowing to expansion zone 54 via air line 50 flows through a high precision 0 psi–2 psi air regulator 68, and the remaining air flows to stabilization zone 63 via air line 62. When extruded tubular film 39 is closed over stabilizing disk 32, valve 64 is closed and valve 65 is opened so that air flowing from air inlet line 67 to stabilization zone 63 via air line 62 is directed through a high precision 0 psi–10 psi air regulator 69.

Referring again to FIG. 2, a valve (not shown) is fitted to the outlet of air line 58 to control the air flow from expansion zone 54. Cooling fluid is introduced through cooling fluid inlet line 70 into an annular cooling chamber 71 located near the periphery of sizing disk 31 and removed from annular cooling chamber 71 through cooling fluid outlet line 72. The upstream corner edge 73 of sizing disk 31 preferably has a reasonably sharp angular cross section to prevent snagging or chattering of extruded tubular film 39. It appears that an upstream corner edge 73 having an overly rounded gradual cross section can allow extruded tubular film 39 to prematurely solidify with a circumference that may be too small to move over sizing disk 31 and cause chattering. Thus where chattering is undesirable or where extruded tubular film 39 cannot be drawn over sizing disk 31, the upstream corner edge 73 of sizing disk 31 preferably has a sharp angular cross section. Moreover, the peripheral surface 74 of sizing disk 31 may, if desired, be gradually tapered toward the axis of the sizing disk 31 in the downstream direction to compensate for temperature shrinkage. The temperature of the cross-head extrusion die 30 is controlled by regulating the electrical power to resistance heater band 75 surrounding annular die body 34 and resistance heater band 76 surrounding adjustable die face 38. At least three and more preferably 8 to 16 spacing adjustment bolts 77 are arranged around the entire periphery of adjustable die face 38 in a generally radial orientation although other suitable bolt configurations may be employed if desired. These spacing adjustment bolts 77 allow changes to be effected between the position of adjustable die face 38 relative to the die mandrel 36. Adjustment of the spacing adjustment bolts 77 is made after mounting bolts (not shown) which secure the adjustable die face 38 to die mandrel 36. After adjustment of the spacing adjustment bolts 77 is completed, the mounting bolts are retightened to prevent movement of the adjustable die face 38 relative to the die mandrel 36. None of the spacing adjustment bolts 77 extend to the mandrel across the annular extrusion flow channel 40, thus eliminating a potential source of weld lines. The lines for air and cooling fluid are fed through a liner sleeve 78 fitted along the axis of die mandrel 36. The liner sleeve 78 may comprise insulating material, e.g. a ceramic liner, which insulates the air and cooling fluid lines from heat emanating from die mandrel 36 and promotes stability of the temperature of the die mandrel 36, polymer melt, etc. A seal 79 of brass or other suitable material in the hollow core 80 of mandrel extension 42 functions as an air barrier between air inlet channels 52 and air exhaust channels 56.

Figure 8:
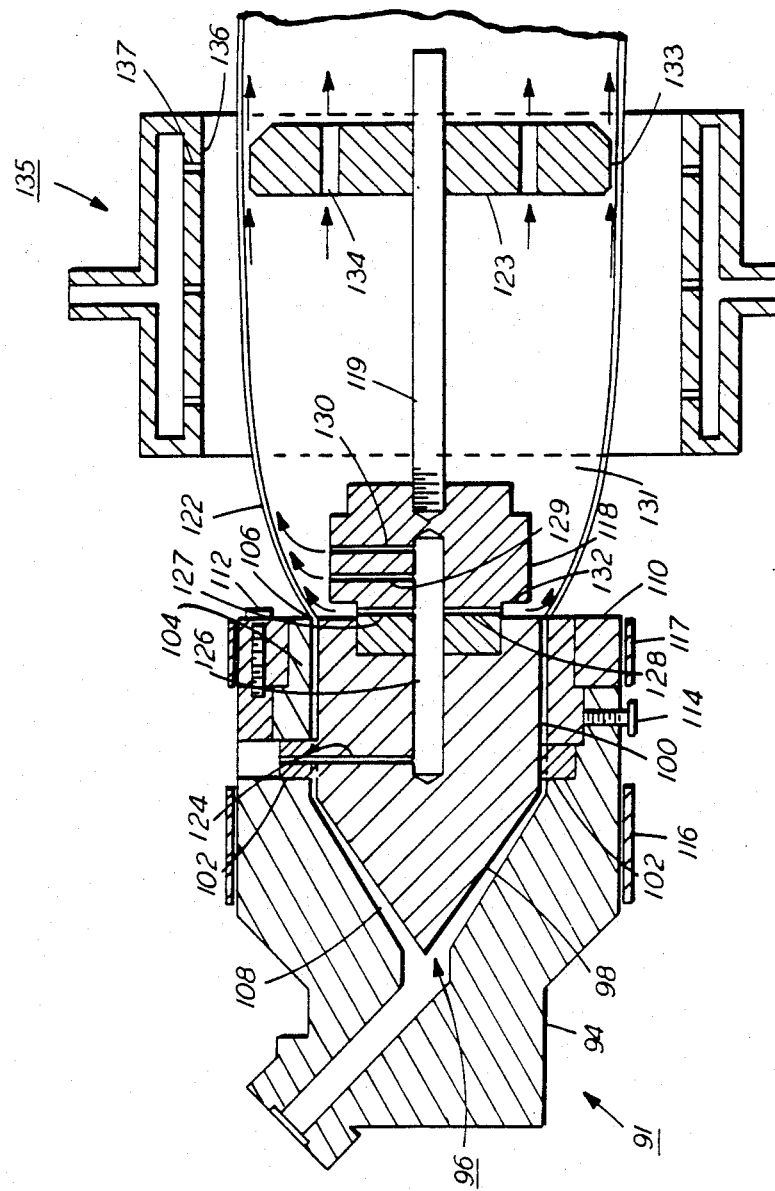
FIG. 8 is a schematic sectional view of another embodiment of an extrusion and shaping die assembly of the present invention.

Referring to FIG. 8, an axial-head extrusion die 91 is shown which may be used as the extrusion die 16 shown FIG. 1. The axial-head extrusion die 91 comprises an annular die body 94 which encircles a floating die mandrel 96 having a conically shaped die mandrel segment 98 and a cylindrically shaped die mandrel segment 100. The floating die mandrel 96 is secured to annular die body 94 by at least three spiders 102 (only two shown in FIG. 8). Mounted to the annular die body 94 is an annular adjustable die face 104, which also encircles the die mandrel 96. The adjustable die face 104 allows adjustment of the die gap at the die outlet 106 between die mandrel 96 and adjustable die face 104 for film thickness variations. Annular die body 94 and annular adjustable die face 104 are spaced from die mandrel 96 and cooperate therewith to form an annular extrusion flow channel 108. The adjustable die face 104 is secured to annular die body 94 by retaining ring 110 and a plurality of retaining bolts 112 (only one shown in FIG. 8). Adjustments to die gap at the die outlet 106 are made by tightening or loosening adjustment bolts 114 (only one shown in FIG. 8). Generally, at least three adjustment bolts 114 are used to adequately control the dimensions of die gap at the die outlet 106. The temperature of the axial-head extrusion die 91 is controlled by regulating the electrical power to resistance heater bands 116 and 117 surrounding annular die body 94 and retaining ring 110, respectively. A mandrel extension 118 is secured to the cylindrically shaped die mandrel segment 100 of die mandrel 96. The mandrel extension 118 and support shaft 119 support a sizing disk 123 and spaces the sizing disk 123 from annular die body 94 to create an expansion zone 131 similar to that expansion zone 18 illustrated in FIG. 1.

In operation, a polymer melt from an extruder, such as the extruder 12 shown in FIG. 1, is pumped into annular die body 94 of axial-head extrusion die 91, through annular extrusion flow channel 108 and out die outlet 106 to form an extruded tubular film 122. Extruded tubular film 122 is pulled over a sizing disk 123 and a stabilizing disk (not shown) such as the stabilizing disk 22 shown in FIG. 1, by a tube puller (not shown) such as tube puller 24 shown in FIG. 1. Pressurized air is supplied from a suitable source such as that illustrated in FIGS. 5 6 and 7 through channel 124, for example, in upper spider 102 and die mandrel 96, air chamber 126 and air inlet channels 127, 128, 129, and 130 to the expansion zone 131 to form an air pillow within expansion zone 131 for expanding and supporting extruded tubular film 122 as it emerges from die outlet 106 and is pulled over sizing disk 123. Air inlet channels 127 and 128 are arranged around the entire periphery of air chamber 126 in a generally radial orientation whereas air inlet channels 129 and 130 are positioned at least along the upper half of mandrel extension 118 to compensate for the effects of gravity on the extruded tubular film 122 when extrusion is effected in a horizontal orientation. When extrusion is carried out in a vertical orientation, the air inlet channels 129 and 130 would normally be arranged around the entire periphery of mandrel extension 118. In addition, air supplied to expansion zone 131 from air inlet channels 127 and 128 is first fed through a recess 132 which serves to diffuse and reduce the velocity of the incoming air. The recess 132 in mandrel extension 118 also serves to diffuse and control the air velocity and permits start up of the extrusion process by preventing the drooping extruded tubular film 122 from adhering to mandrel extension 118 as it initially emerges from the die outlet 106. If desired, the outlets of air inlet channels 127 and 128 may be baffled, e.g. by a lip (not shown) on one side of recess 132 which overhangs the outlets of air inlet channels 127 and 128, thereby deflecting the path of air streams as they enter expansion zone 131 from the outlets of air inlet channels 127 and 128. As in the previously described cross-head extrusion die embodiment, the air supplied to the expansion zone 131 serves to expand, cool and provide physical support in the form of an air pillow for the extruded tubular film 122. When desired, the air supplied to the expansion zone 131 can be a source for air lubrication between the extruded tubular film 122 and peripheral surface 133 of sizing disk 123. The air from expansion zone 131 may optionally be bled out through bleed holes 134 in sizing disk 123.

An optional, exterior, pressure/vacuum floatation ring 135 is also shown in FIG. 8. during operation of the floatation ring 135, portions of the inner annular surface 136 of floatation ring 135 exerts suction or pressure via positive or negative air pressure on the exterior surface of extruded tubular film 122 through air channels 137, as desired, depending upon the specific materials extruded. The distribution of air channels 137 and pressures therethrough need not be uniform along the inner annular surface 136 of floatation ring 135. The axial lengths of the mandrel extension 118 and floatation ring 135 may be selected so that the molten extruded tubular film 122 extruded from the die 91 is supported by air floatation as the tubular film 122 exits from the die outlet 106 region. The tubular film 122 is supported by air floatation along its axial path to the sizing disk 123. The tubular film 122 is supported a sufficient distance along its axial path until its shape is secured by solidification of the molten material. Solidification may occur prior to, during, or subsequent to passage of the tube over the outer peripheral surface 123 of the sizing disk 123. Solidification may occasionally be visually identified by a marked change in transparency around the periphery of the tubular film 123 and is referred to as a "freeze line".

The floatation ring 135 and mandrel extension 118 may have an axial length, for example, on the order of about 12 inches and the difference between the inside face diameter of the floatation ring 135 and the outside diameter of the extruded tubular film 122 may, for example, be from about 0.005 to about 1 inch. Preferably, the tube should be maintained out of contact with the mandrel extension 118 and the floatation ring 135. However, when the annular sizing disk 123 is utilized to create and maintain a compressed air pocket or air pillow in the annular region between the mandrel extension and tube, the tube may be permitted to contact the floatation ring. Contact with the floatation ring 135 may be desirable for exterior sizing or imparting texture to the exterior of the extruded tubular film 122. The floatation ring 135 and annular sizing disk 123 may act in concert to share the load or act in opposition to enhance stability and reduce sensitivity.

Figure 9:
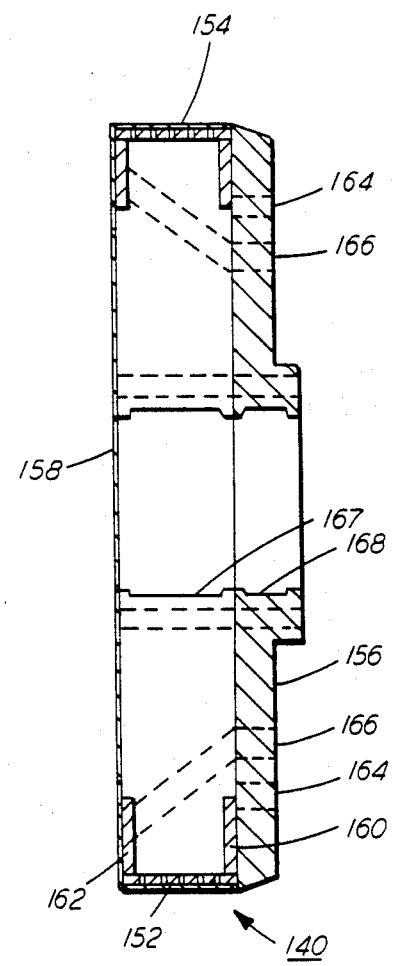
FIG. 9 is a schematic sectional view of one sizing disk embodiment for the extrusion and shaping die assembly of the present invention.
Figure 10:
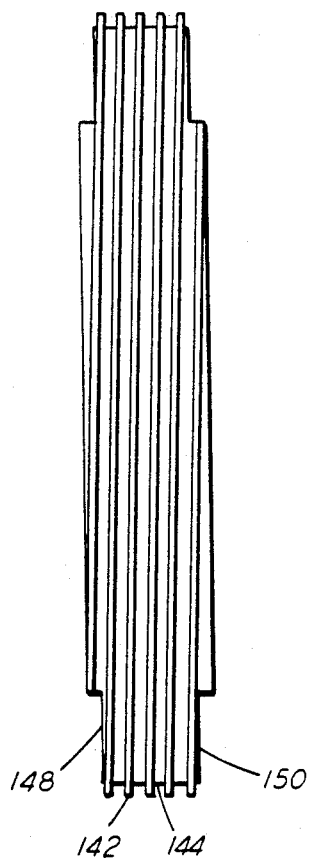
FIG. 10 is a schematic sectional view of a component of a sizing disk embodiment illustrated in FIG. 9.

Referring to FIGS. 9 and 10, an alternative embodiment of a sizing disk utilizing a cooling or heating medium is shown comprising a sizing disk 140 having a ridge 142 which describes a spiral path around the outer peripheral surface 144 of sizing disk 140. If desired, one or more parallel spiral paths for co-current or counercurrent heat exchange medium flow may be utilized. Grooves 148 and 150 also ring the outer perimeter of each side of sizing disk 140 for heat exchange medium entry and exit. A sleeve 152 is fitted tightly against the peak of ridge 142 to form at least one long spiral chamber 154 around the outer peripheral surface 144 of disk 140. A tight fit (generally a temperature interference fit) may be achieved by any suitable means such as mere mechanical fittings such as bolts and/or via the influence of temperature. The sizing disk 140 and sleeve 144 are tightly sandwiched between a retaining plate 156 and a face plate 158 or an integrally machined part to create annular channel 160 and annular channel 162, respectively. In operation, a cooling or heating fluid, such as water, is fed through inlet channels 164 to annular channel 160, to spiral chamber 154, to annular channel 162 and exhausted through outlet channels 166. This embodiment is intended to improve uniformity of cooling of the outer peripheral surface 144, i.e. the outer surface of sleeve 152. Also illustrated in FIG. 9 is the use of annular channels 167 and 168 to thermally insulate sizing disk 140 from the supporting mandrel extension or support shaft. Other suitable means to insulate the sizing disk, such as creamic sleeves and the like, may be used in place of or in addition to the annular channels. Moreover, one or more air bleed ports may optionally be incorporated into the structure of sizing disk 140 to allow fluid to pass through sizing disk 140.

Figure 11:
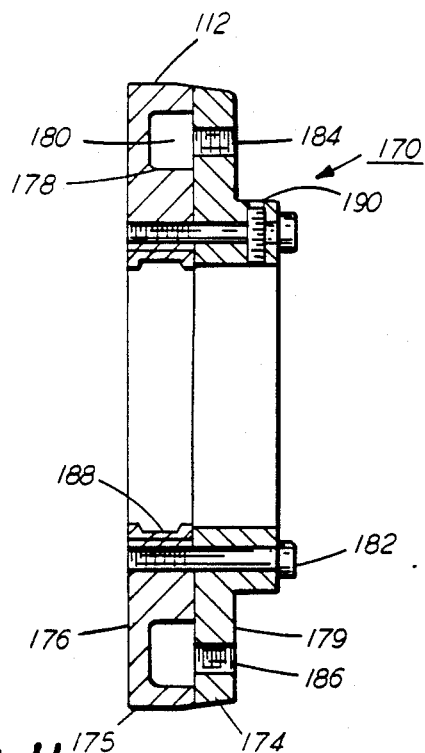
FIG. 11 is a schematic sectional view of another sizing disk embodiment for the extrusion and shaping die assembly of the present invention.
Figure 12:
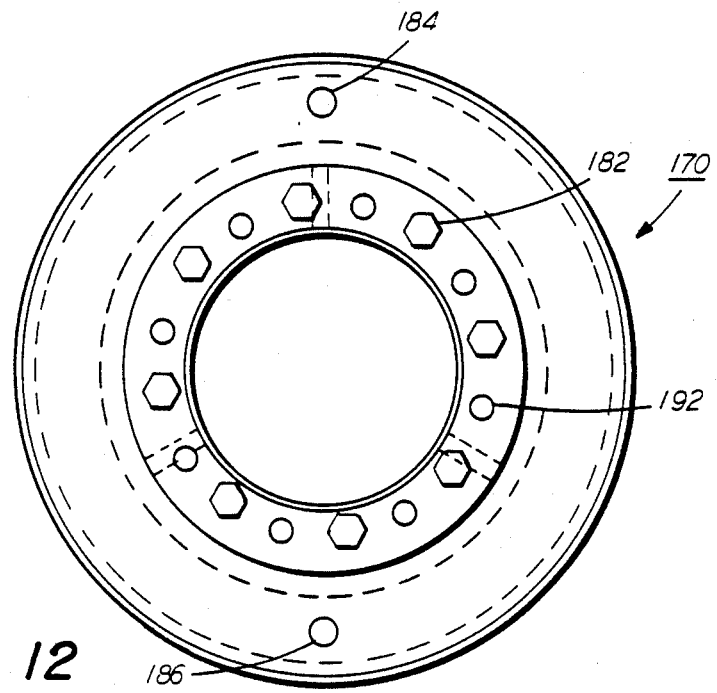
FIG. 12 is another schematic sectional view of the sizing disk embodiment illustrated in FIG. 11.

Another embodiment of a sizing disk is shown in FIGS. 11 and 12 comprising a sizing disk 170 having outer peripheral surface 172 having a tapered segment 174 sloping downwardly in a downstream direction. The leading corner 175 on the upstream side of sizing disk 170 should preferably have a sharp edge because operation has shown that a round gradual cross section allowed the tube to solidify with too small of a circumference and either cause chatter and chatter marks (which may be desirable in some applications) or cause the tube to be too small to pull over sizing disk 170 at startup. One side of disk 176 contains an annular groove 178 near its outer perimeter. A face plate 179 covers annular groove 178 to create annular channel 180. Face plate 178 is secured to disk 176 by means of a sealing compound or gasket and a plurality of mounting screws 182. In operation, a cooling liquid, such as water, is fed through inlet channel 184 to annular channel 180 and exhausted through outlet channel 186. If desired, a plurality of inlet and outlet channels may be employed. Also illustrated in FIG. 11 is the use of annular channel 188 to thermally insulate sizing disk 170 from the supporting mandrel extension or support shaft. Other suitable means to insulate the sizing disk may be used in place of or in addition to the annular channel 188. Set screws 190 are provided to fasten sizing disk 170 to the supporting mandrel extension or support shaft. Optional air bleed holes 192 may be used to facilitate removal of air from the expansion zone when such air removal is deemed desirable. Air bleed holes 192 may be threaded to allow insertion of threaded plugs (not shown) to prevent air from flowing through air bleed holes 192.

Figure 13:
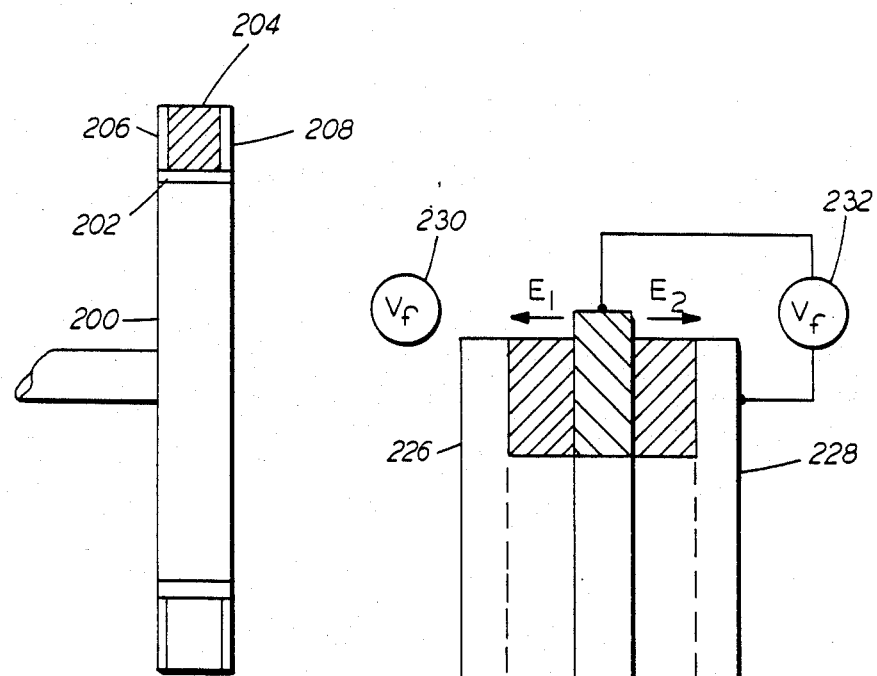
FIG. 13 is a schematic sectional view of an ultrasonic sizing disk embodiment.

Still another embodiment of a sizing disk is shown in FIG. 13 comprising comprising a disk core 200 of suitable material such as metal having a circular cross section bearing a annular band 202 of electrically insulating material. The annular band 202 of electrically insulating material supports an annular piezoelectric material 204 which is sandwiched by two flat annular electrically conductive plate electrodes 206 and 208. An AC voltage of high frequency is applied across the two annular electrically conducting plate electrodes 206 and 208 by electrical leads 210 and 212 (see FIG. 14) which causes the exposed surface of the annular piezoelectric material 204 to expand and move radially away from the circular disk and return to its original position in accordance with the applied frequency as indicated by the arrow.

Figure 15:
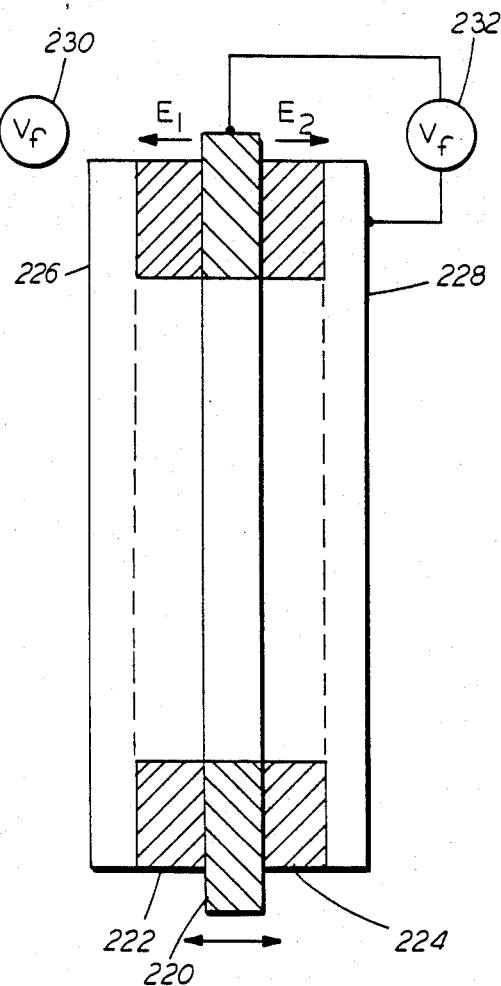
FIG. 15 is a schematic sectional view of another ultrasonic sizing disk embodiment.

In another sizing disk embodiment shown in FIG. 15, a light metallic annular plate 220 is sandwiched between and bonded to two annular piezoelectric rings 222 and 224 which are in turn sandwiched between heavy metal disk shaped electrodes 226 and 228. Electric fields are then applied by AC high frequency voltage sources 230 and 232 between the metallic annular plate 220 and each heavy metal disk shaped electrodes 226 and 228 with the electric fields across the two sets of electrodes being applied 180° out of phase. This causes the annular piezoelectric ring 222 to expand while the other annular piezoelectric ring 224 is contracting and vise versa. This causes the annular plate 220 to oscillate axially as indicated by the arrow.

Figure 16:
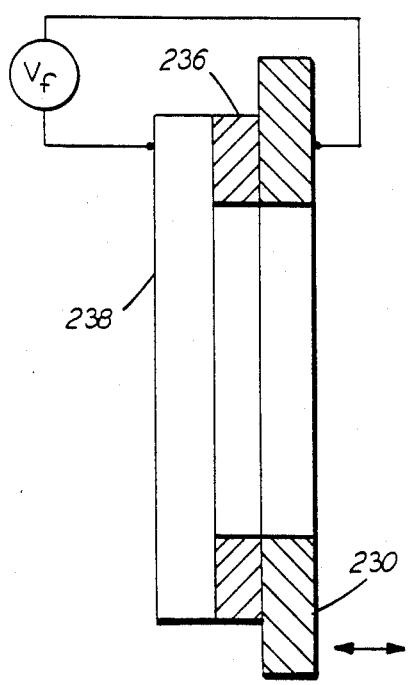
FIG. 16 is a schematic sectional view of still another ultrasonic sizing disk embodiment.

In FIG. 16, an annular piezoelectric material 236 is sandwiched between a heavy metal disk electrode 238 having a circular cross section and a light metal annular disk electrode 240. The annular disk electrode 240 has an outside diameter that is larger than the outside diameters of annular piezoelectric material 236 and hevy metal disk electrode 238. A high frequency AC voltage from source 242 is applied across the two electrodes which causes the light metal annular disk electrode 238 to oscillate torsionally around the x axis when the proper piezoelectric material is utilized. If desired, both the annular piezoelectric material 236 and annular disk electrode 240 may be thin.

Figure 17:
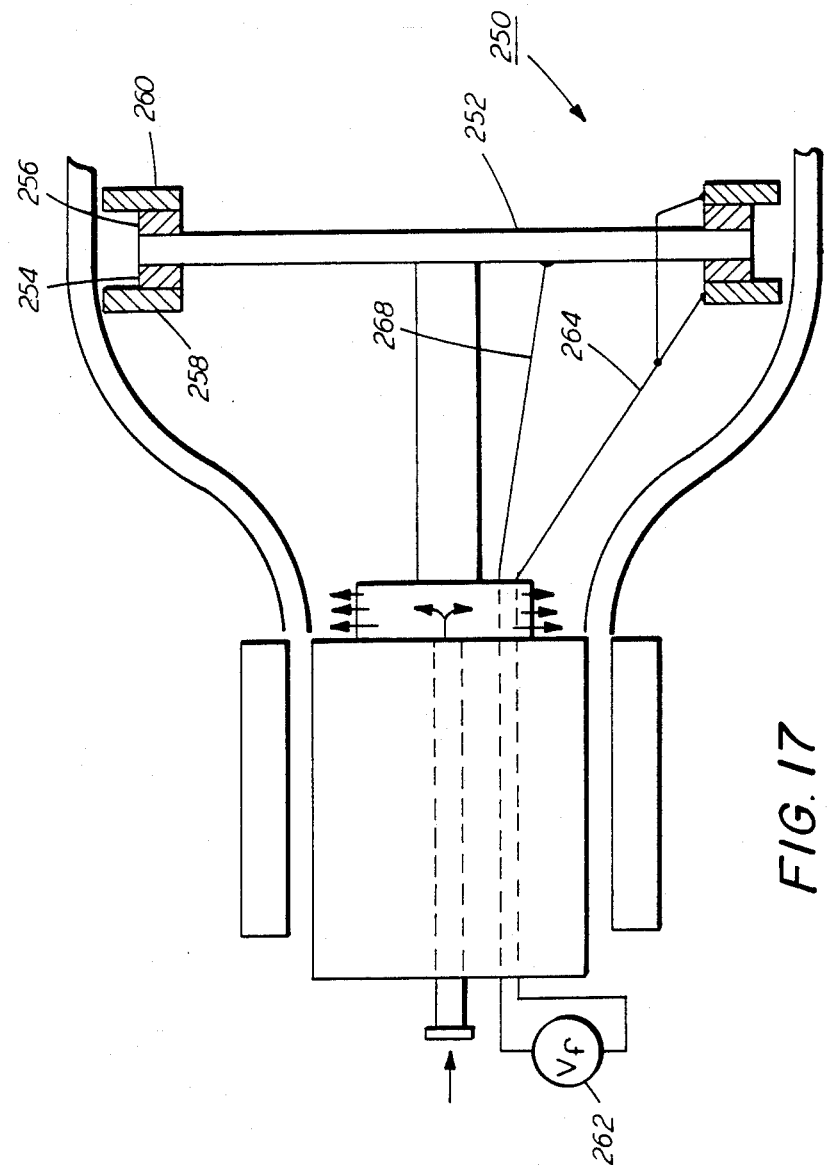
FIG. 17 is a schematic sectional view of still another ultrasonic sizing disk embodiment in combination with a cross head die.

In still another sizing disk embodiment shown in FIG. 17, dual headed sizing disk 250 may comprise a static disk core 252 supporting two annular piezoelectric rings 254 and 256 on opposite sides thereof. The annular piezoelectric rings 254 and 256 are sandwiched between the static disk core 252 two electrically conductive annular ring electrodes 258 and 260, the annular ring electrodes 258 and 260 each have an outside diameter greater than the outside diameter of the piezoelectric rings 254 and 256. A high frequency AC voltage from source 262 is applied across the static disk core 252 and each of the annular ring electrodes 258 and 260 by means of electrical leads 264 and 268 to achieve ultrasonic motion of the outer periphery of the annular ring electrodes 258 and 260.

Figure 18:
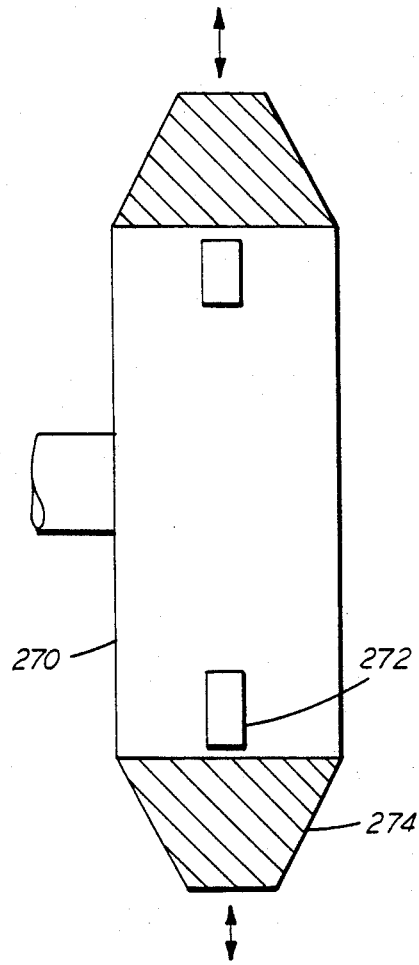
FIG. 18 is a schematic sectional view of still another ultrasonic sizing disk embodiment.

In FIG. 18, a resonator disk 270 is illustrated having a circular cross section and carrying embedded magnetostrictive transducers 272 such as magnetostrictive nickel uniformly spaced around the periphery of the resonator disk 270. The core may be surrounded by an annular ring 274 of the same or different material than that making up the resonator disk 270. The resonator disk 270 and annular ring 274 may be a single integral unit, an interference fit of annulr ring 274 on resonator disk 270, or other suitable arrangement. Embedding of the magnetostrictive transducers 272 uniformly around the periphery of the resonator disk 270 may be effected by any suitable technique such as by screwing the magnetostrictire transducers 272 into threaded holes around the periphery of resonator disk 270.

Figure 19:
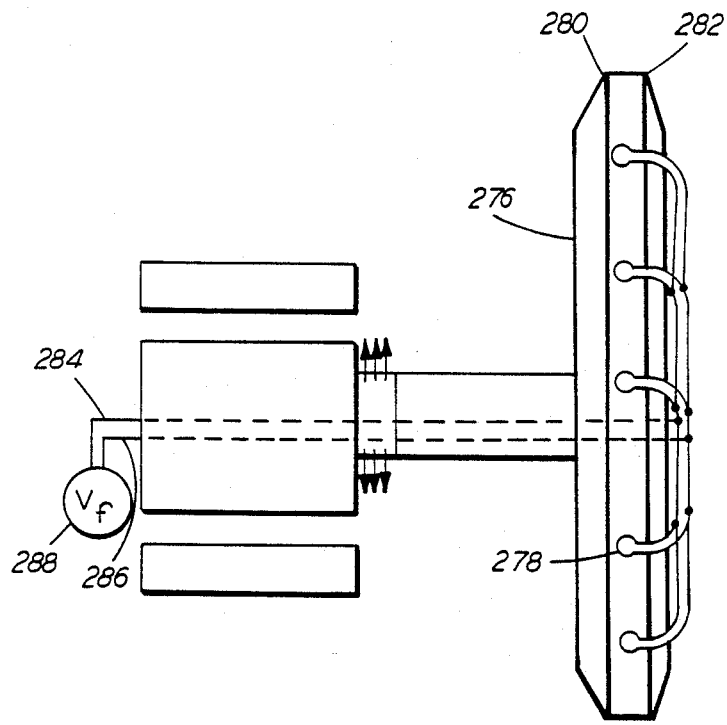
FIG. 19 is a schematic sectional view of still another ultrasonic sizing disk embodiment in combination with a cross head die.

Referring now to FIG. 19, a stainless steel sizing disk 276 is shown having magnetostrictive nickel transducers 278 embedded in uniformly spaced around the periphery of disk 276. These transducers 278 may be embedded by any suitable means into the periphery of the disk such as by screwing the transducers into threaded holes. The diameter of upstream corner edge 280 greater than the downstream corner edge 282. Wire leads 284 and 286 from high frequency AC voltage source 288 to the transducers 278 may be fed from the downstream side of the sizing disk 276 through grooved passageways to ensure that contact between the extruded tubular film 290 and upstream corner edge 280 is unimpaired. This ensures that the inside surface of the tubular film 290 is not distorted by the upstream corner edge 280.

It is known that when a voltage of high frequency (f) alternating polarity (with or without DC bias) is impressed across a piezoelectric material sandwiched between two electrodes, the alternating polarity electric field in the piezoelectric material "core" causes alternating expansion and contraction of the piezoelectric material "core" at a frequency (fp). In such ultrasonically operated transducers, the design is normally arranged such that f=fp, and f=fp=the base resonant frequency of the device. However, this restriction need not be strictly held so long as high amplification "Q" is achieved. If longer motions are required, one may incorporate a multiple sandwich stack of electrodes and piezoelectric material.

Figure 14:
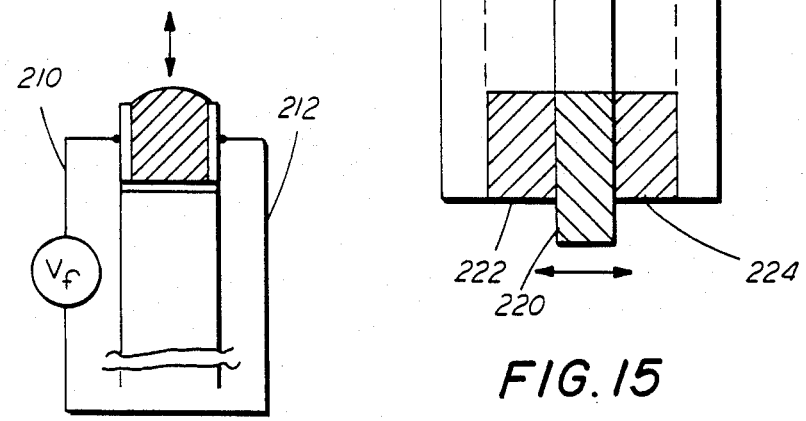
FIG. 14 is an enlarged schematic sectional view of part of the ultrasonic sizing disk of FIG. 13.

Although the embodiments in FIGS. 13 through 17 are treated in terms of piezoelectricity, one may construct corresponding configurations employing magnetostriction. Further, although radially directed oscillatory motion is illustrated in FIG. 13 and 14 and axially directed oscillatory motion is shown in FIGS. 15 and 17, other motions can be selected. For example, other motions may include angular or torsional oscillator motions such as oscillating an electrode torsionally around its x-axis. In FIGS. 18 and 19, magnetostriction is employed to obtain radial oscillation of the sizing disks outside the circumferential periphery of the sizing disk.

Electrical leads to the piezoelectrically-driven sizing disk may be brought in through the die as shown in FIG. 17.

Any suitable piezoelectric polymer, piezoelectric ceramic, nonpolymeric compounds and the like may be used. Typical piezoelectric polymers include polymethyl methacrylate, polyvinyl chloride, polyvinylidene fluoride and the like. Typical piezoelectric ceramics and non-polymeric compounds include CdS (which may be deposited as a thin film) and the like. The temperature characteristics of the piezoelectric should be considered in material selection. Actual design dimensions, material choices and the like depend on the desired dimensions and properties of the material employed in the tube produced. It is believed that the use of ultrasonic sizing disks allows extruded tubes to be pulled over the sizing disk with very low friction and minimal surface contact between the sizing disk surface and the extruded tube to promote improved surface finish.

Figure 21:
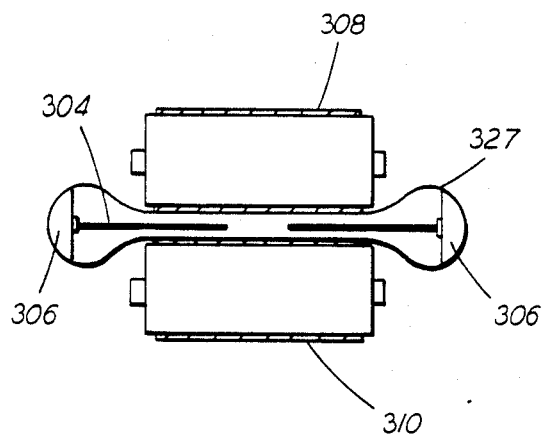
FIG. 21 is an enlarged schematic sectional view along line BB of the tubular film puller illustrated in FIG. 20.
Figure 20:
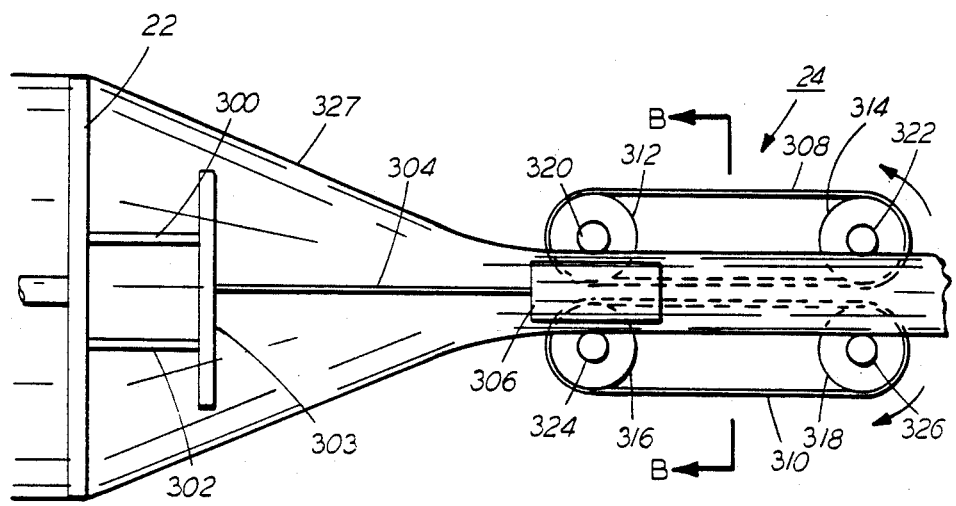
FIG. 20 is an enlarged schematic sectional view of a tubular film puller for pulling the tubular film from the extrusion and shaping die assembly of the present invention.

Further details are provided in FIGS. 20 and 21 of the stabilizing disk 22 and tubular film puller 24 illustrated in FIG. 1. FIG. 21 is a sectional view of FIG. 20 in the direction depicted by the arrows BB. Stabilizing disk 22 has mounted thereto three mounting plates 300, 302, and 303 which function as a cantilevered support for guide shoe support arms 304 and guide shoes 306. Guide shoes 306 are positioned on each side of tubular film puller 24. Tubular film puller 24 comprises a pair of flexible belts 308 and 310 mounted on rollers 312 and 314 and rollers 316 and 318, respectively. The rollers 312, 314, 316, and 318 ride on shafts 320, 322, 324 and 326, respectively. Shafts 320, 322, 324 and 326 are mounted on a suitable support not shown. At least one roller for each flexible belt is driven by a suitable driving means not shown. The flexible belts 308 and 310 may be fabricated of any suitable flexible homogeneous or composite materia such as natural rubber, synthetic rubber, flexible foam, fiber reinforced rubber, and the like.

In operation, the extruded tubular film 327 is pulled over stabilizing disk 22 by tubular film puller 24. In order to achieve a creaseless tubular film 327, an edge on each side of the extruded tubular film 327 is allowed to extend out beyond each side of flexible belts 308 and 310 to avoid being flattened during the pulling operation. A cross-sectional view of the tubular film 327 along BB is shown in FIG. 21. As tubular film 327 is drawn between the flexible belts 308 and 310 it takes on the cross-sectional shape of a dumbbell. Guide shoes 306 ride on the inside surface of the ends of the dumbbell shaped segment of extruded tubular film 327 to ensure tracking of the tubular film 327 through tubular film puller 24. These guide shoes 306 may contact the inside surface of extruded tubular film 327 either before, during and/or after the surface passes rollers 312 and 316. Although guide shoes 306 are shown in FIG. 21 as having a half circle cross section, any other suitable shape such as a full circle, oval, and the like may be used. As illustrated in FIGS. 20 and 21, the the inner surfaces of the opposite sides of the tubular film 327 need not touch each other as the film 327 is drawn between flexible belts 308 and 310. For example, the tubular film 327 to belt frictional force or tube film to belt electrostatic attractive force may be sufficient to pull the film.

The two types of dies previously described include the axial-head (straight-through flow) die and the crosshead (offset) die. The designs of the two dies differ according to the mode of entry of the polymer melt into the annular extension flow channel and the means of supporting the die mandrel. For the axial-head die, the symmetrical design of the die is intended to provide even flow of the polymer melt through the entry region from an extruder as well as through the annular extrusion flow channel resulting, ideally, in extruded annular profiles with constant thickness walls. The mandrel in an axial-head extrusion die is held in place with support mounting bolts or streamlined "spiders" extending to the mandrel from the die body. These supports tend to interrupt the flow of polymer in the annular channel and may create longitudinal seams or "weld lines" in the extruded tube. The weld line formation is aggravated when air and/or cooling fluids flow through passages in the spiders to the mandrel to service downstream sizing equipment. As shown in FIG. 8, air is supplied to the mandrel and mandrel extension via an air passage in one of the spiders. Since the spider must extend through the melt flow channel, the air flow cools the melt surrounding the spider, thus aggravating weld line formation. This cooling effect drastically increases the polymer melt viscosity in this region. This, in turn, causes the melt flow rate to decrease resulting in a decrease in film thickness downstream as well as surface imperfections at the die exit. These effects can be minimized by adjustments to the air flow rate and temperature as well as the melt temperature and die gap eccentricity to regulate the thickness tolerances desired for a photoreceptor belt, typically one percent of the mean thickness. Although it is possible to heat the mandrel electrically, the electrical connections to the heating element and thermocouple must pass through the mandrel support arms.

A preferred alternative approach, however, is to use a cross-head die configuration with the mandrel extending through theentire length of the die, and supply air to the mandrel and mandrel extension from the rear of the die. Entry of the polymer melt to the annular flow channel in the crosshead die configuration is often at right angles to the die axis, as shown in FIG. 2, resulting in a diversion of flow around the mandrel. The severing of flow results in the creation of one weld line (as compared to several weld lines in axial-head dies). Various configurations for minimizing or eliminating the creation of weld lines may be employed. For example, spiral entry configuration type dies with multiple feed ports, dies with upstream distribution configurations and dies with downstream strainer-type mixing sections may be used. The effect of weld lines may further be minimized by the use of downstream ridges, "chokes", or other suitable mixing sections. The choke ridges may have any suitable crosssectional shape such as a hemisphere, pyramid and the like. Moreover, it may be arranged in any suitable manner around the periphery of the annular die body, annular adjustable die face or die mandrel, e.g. one or more rings, a spiral, combinations thereof and the like.

To extrude tubular films, it is necessary for the polymer melt to flow through the annular extrusion flow channel of the extrusion die. The inner surface of the annular die body, particularly the inner surface of an annular adjustable die face of the die body of a crosshead extrusion die at the die outlet, forms the outer surface of the extrusion chamber and the outer surface of the mandrel or "plug" forms the inner surface of the annular extrusion flow channel. Moreover, the die lip configuration may be altered at the die exit to modify the surface quality of the extruded tubular film. The die surface may, if desired, also be roughened by a suitable process such as acid etching or sand blasting to modify the surface quality of the extruded films. To achieve a symmetrical product, a means such as adjustable bolts for manually adjusting the eccentricity of the mandrel relative to the adjacent surface of the die body is provided. The degree of eccentricity depends to some extent on the path of the extruded molten tube relative to horizontal, e.g. whether the extruded molten tube path extends in a generally horizontal or vertical direction. Generally, the die annulus gap at the die outlet may be in the order of about 0.010 inch to about 0.060 inch. The annular extrusion flow channel dimensions are selected so that the pressure drop across the die from the entrance to the outlet including adaptors and the like is less than the maximum pressure obtainable from the extruder for a given desired throughput rate of the polymer.

The axial-head die and the crosshead die described in the present invention are similar in many respects to annular exit cross section dies utilized commercally for blown film extrusion and pipe extrusion. Ref. Principles of Polymer Procssing, Z. Tadmor and C. G. Gogos, WileyInterscience, N.Y. (1979), pp. 551–554; Plastic Molds and Dies, L. Sors, L. Bardocz and I. Radnoti, VanNostrand Reinhold Co., N.Y., (1981), pp. 208–211; and Extrusion Dies - Design and Engineering Computations, W. Michaeli, Hanser Publishers, Munich, Vienna, N.Y. (1984); pp. 137–161. The present invention is not restricted to the use of axial or crosshead dies. We have also used a spiral mandrel die which is of the ytpe commonly used currently in the film blowing industry. Ref. above publications (Tadmore and Gogos, Michaeli). This die was modified similarly to the axial and crosshead dies shown herein.

The mandrel extension provides air and liquid passages for the purpose of cooling, expanding, and physically supporting the extruded tubular film immediately upon exiting from the die. The diameter of the mandrel extension immediately adjacent the mandrel is less than that of the diameter of the mandrel. A typical difference between the outside diameter of the mandrel and the outside diameter of the mandrel extension may be, for example, from about 0.005 inch to about 1 inch The diameter of the mandrel may be larger, equal to or smaller than the mandrel downstream from the recess where contact with the extruded tubular film is unlikely to occur during start up. Typical cross sectional dimensions for recesses having vertical sides are 0.75 inch×0.75 inch and 0.75 inch×0.5 inch. Although a recess is preferred because it more effectively channels the air into the expansion chamber during start up, the mandrel extension need not have a recess if it has a sufficiently smaller diameter than the mandrel so that the extruded tube material does not contact and adhere to the mandrel extension during start up. The specific mandrel extension dimensions to be selected depends on the melt strength, droop, etc. of the hot melt and other conditions employed. As pointed out above, satisfactory results during startup have been achieved with mandrel extensions having a radius from about ⅛ inch to about ¾ inch shorter than the radius of the mandrel, the shorter radius region extending from about ⅜ inch to about ½ inch axially downstream from the the junction of the mandrel extension and die mandrel. These dimensions are for purposes of illustration and other values outside these ranges may be utilized depending upon the specific materials and other conditions utilized. As previously indicated, the recess in the mandrel extension also serves to diffuse and control the air velocity and permits start up of the extrusion process by preventing the extruded tubular film from adhering to mandrel extension as it initially emerges from the die outlet. The recess also serves to diffuse and reduce the velocity of the incoming air. The recess may be of any suitable cross section such as a "U", a "V", a "W", a "C" lying on its side with the opening facing away from the axis of the mandrel extension, and the like. The sides of the recess need not be perpendicular to the axis of the mandrel extension, but may be at any suitable acute or obtuse angle to the axis, curved, overhanging the air inlet channels, and the like. If the extruded tubular film is extruded in a horizontal direction, a greater number of air passages may optionally be located in the upper half of the mandrel extension than below to counter the effect of gravity on the extruded tubular film. If desired, a plurality of recesses may be utilized along the axial length of the mandrel extension.

The sizing disk may comprise a removable disk or may even be constructed as an integral segment of the mandrel extension. It may comprise any suitable material such as stable metals, ceramics, plastics composites, and the like. Typical sizing disk materials include stainless steel, aluminum, brass, and the like. The sizing disk preferably includes an insulating hub between the sizing disk and the supporting mandrel extension to thermally insulate the sizing disk from the mandrel extension. Minimizing heat transfer between the mandrel extension to the sizing disk may be accomplished by other suitable means such as reducing the contact area between the mandrel extension and the sizing disk by means of ridges on the mandrel extension and/or sizing disk to maintain an air gap therebetween. The distance between the sizing disk and the die outlet depends upon a number of factors such as the properties of the polymer materials extruded and the temperature of the sizing disk and may be determined experimentally. For example, the distance between the sizing disk and the die outlet decreases with materials having sharp freezing tempertures and reduced melt strength. Rapid cooling to room temperature reduces distortions due to locally distinct cooling rates and relaxation of nonuniform stress induced distortions. Formation of a freeze line closer to the upstream edge of the sizing disk promotes greater positive control over tube dimensions, tolerances and often clarity.

As previously discussed, the upstream corner edge of the sizing disk should preferably have a resonably sharp angular cross section to prevent snagging or chattering of extruded tubular film. Optionally, the peripheral surface of the sizing disk may be gradually tapered toward the axis of the sizing disk in the downstream direction to compensate for temperature contraction of the extruded tube. The periphery of the sizing disk is preferably roughened slightly to minimize tube chattering. The sizing disk has a diameter larger than the diameter of the mandrel. The larger diameter ensures an adequate seal between the sizing disk perphery and the extruded tube thereby preventing leakage of fluid from the expansion zone past the sizing disk and also markedly reduces the cost of dies for any given product diameter. The ratio of the diameter of the sizing disk to the diameter of the mandrel is also determined by the material properties which normally govern blow-up ratios, and other variables such as temperature, distance of the disk from the die exit, and the like and is, therefore, determined experimentally. Air bleed holes in the sizing disk may be used, if desired, in concert with an air pressure regulator to prevent any excess buildup of static/dynamic air pressure which exceeds a steady state and causes the tube to excessively balloon and exceed the desired tube diameter.

The stabilizing disk may comprise any suitable material such as stable metals, ceramics, plastic, composites, and the like. The stabilizing disk preferably includes an insulating hub between the stabilizing disk and the supporting mandrel extension to thermally insulate the stabilizing from the mandrel extension. There is broad latitude in the distance that may be maintained between the stabilizing disk and the sizing disk. For example, depending upon the material extruded, satisfactory results have been achieved when the distance between the stabilizing disk and the sizing disk of was between about 3 inches and about two feet. It is believed that distances outside this range may also be suitable. The upstream corner edge of stabilizing disk should preferably have a gradual angular cross section. Since the diameter of the disk is slightly larger than the diameter of the extruded tube, a gradual angular cross section minimizes the formation of powder due to scraping of the stabilizing disk against the extruded tube. Preferably, the diameter of the stabilizing disk is about 0.001 to about 0.010 inch greater than the inside diameter of the tube immediately downstreamfrom the stabilizing disk. The peripheral surface of the stabilizing disk should preferably be level or gradually tapered toward the axis of the sizing disk in the downstream direction. There is considerable latitude in selecting the tube/sizing disk periphery contact distance in the direction of the axis of the sizing disk. Generally, the distance should not be so great that friction precludes the tube from being pulled by the puller. The periphery of the stabilizing disk is preferably roughened slightly to reduce friction. If desired, a plurality of stabilizing disks may be employed and one or more stabilizing disks may be cooled or heated. Generally, an increase in the number of stabilizing disks used results in an increase in the friction that must be overcome in pulling the extruded tubular film over the disks.

The specific properties of the thermoplastic polymer material extruded and the extruded tubular film dimensions desired affect the process control variables selected. For example, various extruder operation conditions will affect the ultimate extruded tubular film produced. These conditions include polymer throughput rate, extruder screw rpm, extruder barrel temperatures, high temperatures, internal cooling air flow rates and the like to enable extrusion of a tube that can be stretched and pulled over the sizing disk. Process control variables for the die include, for example, temperature, air flow rates, vacuum/pressure levels, stretch ratios, post-die cooling, and post-die sizing. When the melt temperature is too high, the melt strength of the polymer may become insufficient for stretching to occur. As a result, the extruded tubular film cannot be pulled over the sizing disk without the tube first collapsing onto the mandrel extension. On the other hand, when the melt temperature is too low, the viscosity of the polymer melt can increase thereby reducing the polymer flow or even causing freezing of the polymer at the die exit. The extrusion temperature estimate for example, for polypropylene as the extruded material is 250° C. Accurate control of the temperature attained as well as control of temperature uniformity of the die outlet facilites regulation of the thickness tolerances and subsequent distortions of the extruded tubular film as the polymer flow rate is dependent on its viscosity which in turn is a strong function of temperature. Normally, the die temperature and die head temperatures are regulated by the same temperature controller such as a Barber Colman controller.

The extruded tubular film process provides considerable flexibility in producing films of various sizes and of various physical and mechanical properties. With respect to film dimensions, the thickness, width, and the like of the extruded film can easily be regulated by varying the blow-up ratio and/or drawdown ratio. The expressions "blow-up ratio" and "drawdown ratio" are defined as follows:

Blow-up ratio=Inside diameter of tubular film/Inside diameter of die annulus

Drawdown ratio=Film velocity at tube puller/Average film velocity at die outlet

Increasing the blow-up ratio will increase the flat width of the film (i.e. 1κ tube circumference), whereas increases in either the blow-up or drawdown ratios will decrease the film thickness for a given die output mass rate.

The system of the present invention utilizes a cost effective die suitable for producing thin-walled, large diameter pliable tubes which meet precise tolerance requirements and which are free of creases or other deformations.

A number of examples are set forth herein below that are illustrative of different materials, apparatus and conditions that can be utilized in practicing the invention. It will also be apparent that the invention can be practiced with many other types of materials, apparatus and conditions and can have many different uses in accordance with the disclosure above and as pointed out hereinafter.

Example I

An extruded tubular film of nylon polymer was prepared utilizing a crosshead die. The die had a mandrel diameter of about 2.5 inches. The die gap was about 0.020 inch and the L/H ratio was about 50/1. The mandrel supported a mandrel extension having a diameter of 2 inches and a recess immediately adjacent the mandrel that was 3/16 inch wide and 1= inch deep. The recess contained 18 radial air channels, each having a 3/16 inch diameter, uniformly spaced around the periphery of the mandrel extension. Air was fed to the radial air channels through air lines located in the mandrel and mandrel extension. The mandrel extension supported a 7.25 inch diameter sizing disk 2.5 inches from the mandrel. The flat sizing disk periphery was roughened slightly and had an axial tube contacting distance of 0.437 inch. The upstream corner of the sizing disk had a radius of curvature of 1/32 inch. The mandrel extension also supported a 7.212 inch diameter, ⅜ inch thick stabilizing disk located 24 inches downstream from the sizing disk. The barrel temperature profile was 222° C., 228° C., 230° C., 230° C., and 232° C. and the die temperature was 238° C. The rpm of the extruder screw was 13.5 and the die pressure drop was 5,700 psi. The line speed was 5.5 ft/min. Upon start up, the molten extruded polymer tube was manually pulled over the sizing disk and stabilizing disk while compressed air was introduced through the radial air channels in the mandrel extension recess. The molten polymer did not contact nor adhere to the mandrel extension. The polymer tube was then pulled over the stabilizing disk and over a pair of Teflon disk guide shoes downstream of the stabilizing disk. The disk guide shoes were supported by cantilevered rods secured to the sizing disk. Finally, the tube was partially flattened so that it assumed a FIG. 8 cross section and fed into the space between parallel opposing surfaces of a pair of driven neoprene belts bearing a natural gum rubber outer coating. Since the partially flattened extruded tube was wider than the width of the belts, the tube assumed a cross sectional shape resembling a dumbbell or squashed FIG. 8. Each of the Teflon disk guide shoes was positioned inside the substantially circular ends of the dumbbell shaped cross sectional segment. The pressure of the air introduced through the radial air channels in the mandrel extension recess was reduced after the start up process was initiated to prevent rupturing the fully formed melt bubble in the expansion zone and to susequently prevent leakage between the tube and the sizing disk and to achieve steady state condition in the expansion zone. An excellent pliable, thin-walled, seamless tube was obtained.

Example II

An extruded tubular film of nylon polymer was prepared utilizing a crosshead die. The die had a mandrel diameter of about 6 inches. The die gap was about 0.012 inch and the L/H ratio was about 100/1. The mandrel supported a mandrel extension having a diameter of 3 inches and a recess immediately adjacent the mandrel that was ¼ inch wide and ¾ inch deep. The recess contained 56 radial air channels, each having a ¼ inch diameter, uniformly spaced around the periphery of the mandrel extension. Air was fed to the radial air channels through air lines located in the mandrel and mandrel extension. The mandrel extension supported a 7.5 inch diameter sizing disk 3 inches from the mandrel. The flat sizing disk periphery was roughened slightly and had an axial tube contacting distance of 0.437 inch. The upstream corner of the sizing disk had a radius of curvature of 1/32 inch. The mandrel extension also supported a 7.212 inch diameter, ⅜ inch thick stabilizing disk located 24 inches downstream from the sizing disk. The barrel temperature profile was 222° C., 226° C., 226° C., 226° C., and 237° C. and the die temperature was 237° C. The rpm of the extruder screw was 8 and the die pressure drop was 7,000 psi. The line speed was 2 ft/min. Upon start up, the molten extruded polymer tube was manually pulled over the sizing disk and stabilizing disk while compressed air was introduced through the radial air channels in the mandrel extension recess. The molten polymer did not contact nor adhere to the mandrel extension. The polymer tube was then pulled over the stabilizing disk and over a pair of Teflon disk guide shoes downstream of the stabilizing disk. The disk guide shoes were supported by cantilevered rods secured to the sizing disk. Finally, the tube was partially flattened so that it assumed a FIG. 8 cross section and fed into the space between parallel opposing surfaces of a pair of driven neoprene belts bearing a natural gum rubber outer coating. Since the partially flattened extruded tube was wider than the width of the belts, the tube assumed a cross sectional shape resembling a dumbbell or squashed FIG. 8. Each of the Teflon disk guide shoes was positioned inside the substantially circular ends of the dumbbell shaped cross sectional segment. The pressure of the air introduced through the radial air channels in the mandrel extension recess was reduced during the start up process to prevent rupturing the fully formed melt bubble in the expansion zone and to subsequently prevent leakage between the tube and the sizing disk and to achieve steady state condition in the expansion zone. An excellent pliable, thin-walled, 4.3 mil thick, seamless tube was obtained.

Example III

An extruded tubular film of nylon polymer was prepared utilizing a crosshead die. The die had a mandrel diameter of about 6 inches. The die gap was about 0.020 inch and the L/H ratio was about 60/1. The mandrel supported a mandrel extension having a diameter of 3 inches and a recess immediately adjacent the mandrel that was ¼ inch wide and ¾ inch deep. The recess contained 56 radial air channels, each having a ¼ inch diameter, uniformly spaced around the periphery of the mandrel extension. Air was fed to the radial air channels through air lines located in the mandrel and mandrel extension. The mandrel extension supported a 10.763 inch diameter sizing disk 2.5 inches from the mandrel. The flat sizing disk periphery was roughened slightly and had an axial tube contacting distance of 0.437 inch. The upstream corner of the sizing disk had a radius of curvature of 1/32 inch. The mandrel extension also supported a 10.724 inch diameter, ⅜ inch thick stabilizing disk located 24 inches downstream from the sizing disk. The barrel temperature profile was 230° C., 270° C., 260° C., 255° C., and 250° C and the die temperature was 245° C. The rpm of the extruder screw was 15 and the die pressure drop was 5,450 psi. The line speed was 3 ft/min. Upon start up, the molten extruded polymer tube was manually pulled over the sizing disk and stabilizing disk while compressed air was introduced through the radial air channels in the mandrel extension recess. The molten polymer did not contact nor adhere to the mandrel extension. The polymer tube was then pulled over the stabilizing disk and over a pair of Teflon disk guide shoes downstream of the stabilizing disk. The disk guide shoes were supported by cantilevered rods secured to the sizing disk. Finally, the tube was partially flattened so that it assumed a FIG. 8 cross section and fed into the space between parallel opposing surfaces of a pair of driven neoprene belts bearing a natural gum rubber outer coating. Since the partially flattened extruded tube was wider than the width of the belts, the tube assumed a cross sectional shape resembling a dumbbell or squashed figure 8. Each of the Teflon disk guide shoes was positioned inside the substantially circular ends of the dumbbell shaped cross sectional segment. The pressure of the air introduced through the radial air channels in the mandrel extension recess was reduced after the start up process was initiated to prevent rupturing the fully formed melt bubble in the expansion zone and to susequently prevent leakage between the tube and the sizing disk and to achieve steady state condition in the expansion zone. An excellent pliable, thin-walled, 4.9 mil thick, seamless tube was obtained.

Example IV

An extruded tubular film of nylon polymer and pigment particles was prepared utilizing a spiral die. The die had a mandrel diameter of about 3 inches. The die gap was about 0.032 inch and the L/H ratio was approximately 12/1. The mandrel supported mandrel extension having a maximum diameter of 2 inches and a recess immediately adjacent the mandrel that was ¼ inch wide and ¼ inch deep. The recess contained 8 radial air channels, each having a ¼ inch diameter, uniformly spaced around the periphery of the mandrel extension. Air was fed to the radial air channels through air lines located in the mandrel and mandrel extension. The mandrel extension supported a 10.689 inch diameter sizing disk 3 inches from the mandrel. The flat sizing disk periphery was roughened slightly and had an axial tube contacting distance of 0.437 inch. The upstream corner of the sizing disk had a radius of curvature of 1/32 inch. The mandrel extension also supported a 10.724 inch diameter, ⅜ inch thick stabilizing disk located 24 inches downstream from the sizi disk. The barrel temperature profile was 225° C., 255° C., 255° C., 245° C., and 240° C and the die temperature was 225° C. The rpm of the extruder screw was 14 and the die pressure drop was 2,250 psi. The line speed was 4 ft/min. Upon start up, the molten extruded polymer tube was manually pulled over the sizing disk and stabilizing disk while compressed air was introduced through the radial air channels in the mandrel extension recess. The molten polymer did not contact nor adhere to the mandrel extension. The polymer tube was then pulled over the stabilizing disk and over a pair of Teflon disk guide shoes downstream of the stabilizing disk. The disk guide shoes were supported by cantilevered ford secured to the sizing disk. Finally, the bue was partially flattened so that it assumed a FIG. 8 cross section and fed into the space between parallel opposing surfaces of a pair of driven neoprene belts bearing a natural gum rubber outer coating. Since the partially flattened extruded tube was wider than the width of the belts, the tube assumed a cross sectional shape resembling a dumbbell or squashed FIG. 8. Each of the Teflon disk guide shoes was positioned inside the substantially circular ends of the dumbbell shaped cross sectional segment. The pressure of the air introduced through the radial air channels in the mandrel extension recess was reduced after the start up process was initiated to prevent rupturing the fully formed melt bubble in the expansion zone and to susequently prevent leakage between the tube and the sizing disk and to achieve steady state condition in the expansion zone. An excellent pliable, thin-walled, seamless tube was obtained.

Example V

An extruded tubular film of polyethylene terephthalate glycol copolyester was prepared utilizing a spiral die. The die had a mandrel diameter of about 4 inches. The die gap was about 0.032 inch and the L/H ratio was approximately 12/1. The mandrel supported a mandrel extension having a maximum diameter of 2 inches and a recess immediately adjacent the mandrel that was ¼ inch wide and ¼ inch deep. The recess contained 8 radial air channels, each having a ¼ inch diameter, uniformly spaced around the periphery of the mandrel extension. Air was fed to the radial air channels through air lines located in the mandrel and mandrel extension. The mandrel extension supported a 13.077 inch diameter sizing disk 2.5 inches from the mandrel. The flat sizing disk periphery was roughened slightly and had an axial tube contacting distance of 0.437 inch. The upstream corner of the sizing disk had a radius of curvature of 1/32 inch. The mandrel extension also supported a 13.038 inch diameter, ⅜ inch thick stabilizing disk located 24 inches downstream from the sizing disk. The barrel temperature profile was 215° C., 229° C., 229° C., 222° C., and 217° C and the die temperature was 214° C. The rpm of the extruder screw was 19 and the die pressure drop was 1,350 psi. The line speed was 3 ft/min. Upon start up, the molten extruded polymer tube was manually pulled over the sizing disk and stabilizing disk while compressed air was introduced through the radial air channels in the mandrel extension recess. The molten polymer did not contact nor adhere to the mandrel extension. The polymer tube was then pulled over the stabilizing disk and over a pair of Teflon disk guide shoes downstream of the stabilizing disk. The disk guide shoes were supported by cantilevered rods secured to the sizing disk. Finally, the tube was partially flattened so that it assumed a FIG. 8 cross section and fed into the space between parallel opposing surfaces of a pair of driven neoprene belts bearing a natural gum rubber outer coating. Since the partially flattened extruded tube was wider than the width of the belts, the tube assumed a cross sectional shape resembling a dumbbell or squashed FIG. 8. Each of the Teflon disk guide shoes was positioned inside the substantially circular ends of the dumbbell shaped cross sectional segment. The pressure of the air introduced through the radial air channels in the mandrel extension recess was reduced after the start up process was initiated to prevent rupturing the fully formed melt bubble in the expansion zone and to susequently prevent leakage between the tube and the sizing disk and to achieve steady state condition in the expansion zone. An excellent pliable, thin-walled, seamless tube was obtained.

The invention has been described in detail with particular reference to preferred embodiments thereof but it will be understood that variations and modifications can be effected within the spirit and scope of the invention as described herein above and as defined in the appended claims.

We claim:

1. An apparatus for the fabrication of a creaseless, pliable, thin-walled tube comprising an extrusion and shaping die assembly comprising an annular die body, a mandrel supported within said annular die body, said die body and mandrel cooperating to form an annular extrusion flow channel around said mandrel, said annular die body, mandrel and annular extrusion flow channel terminating at one end at a die outlet, means to supply molten polymeric material to said die assembly under pressure to force said material through said annular extension flow channel and out said die outlet thereby forming an extruded moving tube of said material, a mandrel extension mounted on said mandrel adjacent said die outlet, said mandrel extension having a diameter less than the diameter of said mandrel at least adjacent said mandrel, said mandrel extension extending outwardly from said die in the direction in which said tube is extruded, at least one recess along the periphery of said mandrel extension adjacent said die outlet, at least one non-rotatable sizing disk free of vacuum slits supported by said mandrel extension, said sizing disk comprising a peripheral surface having an upstream corner edge having an angular cross section, said mandrel and at least a segment of said mandrel extension having at least one fluid passageway extending through said mandrel extension to channel fluid introduced under pressure from said annular die body axially through said mandrel to at least two channels extending outwardly from the axis of said mandrel extension into said recess to diffuse said fluid and to form in cooperation with said tube of said molten polymeric material and said sizing disk a first fluid pillow to cool and support said tube around and spaced from said mandrel extension, said sizing disk having an outer peripheral surface which in cooperation with the inner surface of said tube forms a fluid tight seal, at least one non-rotatable stabilizing disk supported by said sizing disk, said stabilizing disk being spaced from said sizing disk in the direction in which said tube is extruded to define in cooperation with said sizing disk and said tube a second fluid pillow, means to supply fluid under pressure into said annular die body, axially through said mandrel, through said mandrel extension, and through said sizing disk to introduce said fluid under pressure into said second fluid pillow to support said tube, means to independently control the pressure of fluid in said fluid pillows between said die outlet and said disk and between said sizing disk and said stabilizing disk at different pressures, and pulling means to simultaneously pull said tube out of said die outlet and around said sizing disk without twisting said tube, maintain at least one opening within the interior of said tube extending along the length of said tube as said tube proceeds past said pulling means and maintain said tube free of creases as said tube proceeds past said pulling means.

2. Apparatus for the fabrication of a creaseless, pliable, thin-walled tube according to claim 1 wherein said sizing disk comprises an annular cooling chamber to receive a circulating heat exchange fluid.

3. Apparatus for the fabrication of a creaseless, pliable, thin-walled tube according to claim 1 wherein said fluid passageway includes a baffle to diffuse and control velocity of said fluid introduced under pressure from said annular die body axially through said mandrel and outwardly from the axis of said mandrel extension through said channels.

4. Apparatus for the fabrication of a creaseless, pliable, thin-walled tube according to claim 1 wherein said sizing disk comprises a peripheral surface which is gradually tapered toward the downstream axis of said sizing disk.

5. Apparatus for the fabrication of a creaseless, pliable, thin-walled tube according to claim 1 wherein said annular die body comprises an adjustable die face which in cooperation with said mandrel forms said die outlet, and said adjustable die face includes means for eccentrically offsetting said adjustable die face realtive to said mandrel to control the uniformity of thickness of said tube of molten polymeric material.

6. Apparatus for the fabrication of a creaseless, pliable, thin-walled tube according to claim 1 wherein said extrusion and shaping die is a cross-head die.

7. Apparatus for the fabrication of a creaseless, pliable, thin-walled tube according to claim 1 wherein said stabilizing disk comprises an annular cooling chamber to receive a circulating heat exchange fluid.

8. Apparatus for the fabrication of a creaseless, pliable, thin-walled tube according to claim 1 wherein said sizing disk comprises means for minimizing heat transfer between said sizing disk and said supporting mandrel extension to thermally insulate said sizing disk from said mandrel extension.

9. Apparatus for the fabrication of a creaseless, pliable, thin-walled tube according to claim 1 whereins aid mandrel and said extension are aligned vertically to extrude said tube in a vertical direction.

10. Apparatus for the fabrication of a creaseless, pliable, thin-walled tube according to claim 1 wherein said mandrel and said extension are aligned horizontally to extrude said tube in a horizontal direction.

11. An apparatus for the fabrication of a creaseless, pliable, thin-walled tube comprising an extrusion and shaping die assembly comprising an annular die body, a mandrel supported within said annular die body, said die body and mandrel cooperating to form an annular extrusion flow channel around said mandrel, said annular die body, mandrel and annular extrusion flow channel terminating at one end at a die outlet, means to supply molten polymeric material to said die assembly under pressure to force said material through said annular extrusion flow channel and out said die outlet thereby forming an extruded moving tube of said material, a mandrel extension mounted on said mandrel adjacent said die outlet, said mandrel extension having a diameter less than the diameter of said mandrel at least adjacent said mandrel, said mandrel extension extending outwardly from said die in the direction in which said tube is extruded, at least one non-rotatable sizing disk supported by said mandrel extension, said mandrel and at least a segment of said mandrel extension having at least one fluid passageway extending through said mandrel extension to channel fluid introduced under pressure from said annular die body axially through said mandrel to at least two channels extending outwardly from the axis of said mandrel extension to define in cooperation with said tube of said molten polymeric material and said sizing disk a first fluid pillow to cool and support said tube around and spaced from said mandrel extension, said sizing disk having an outer peripheral surface which in cooperation with the inner surface of said tube forms a fluid tight seal, at least one non-rotatable stabilizing disk supported by said sizing disk, said sizing disk comprising means to ultrasonically vibrate said peripheral surface, said stabilizing disk being spaced from said sizing disk in the direction in which said tube is extruded to define in cooperation with said sizing disk and said tube a second fluid pillow, said sizing disk having at least one fluid passageway connected to a passageway through said mandrel extension to channel fluid introduced under pressure from said annular die body axially through said mandrel and through the axis of said mandrel extension to said second fluid pillow to support said tube, means to independently control the pressure of fluid in said fluid pillows between said die outlet and said sizing disk and between said sizing disk and said stabilizing disk at different pressures, and pulling means to simultaneously pull said tube out of said die outlet and around said sizing disk without twisting said tube, maintain at least one opening within the interior of said tube extending along the length of said tube as said tube proceeds past said pulling means and maintains said tube free of creases as said tube proceeds past said pulling means.

12. A process for the fabrication of a creaseless, pliable, thin-walled tube comprising extruding a molten polymeric material through an annular opening of a shaping die comprising an annular die body and a mandrel supported within said annular die body to form a moving polymeric tube circumferentially surrounding a central mandrel extension extending outwardly from said shaping die in the direction in which said tube is extruded, said mandrel extension having a diameter less than the diameter of said mandrel at least adjacent said mandrel and having at least one recess along the periphery of said mandrel extension adjacent said mandrel, pulling said moving polymeric tube into contact with and over at least one non-rotatable sizing disk spaced from said annular opening and over at least one non-rotatable stabilizing disk spaced from said sizing disk while maintaining the creaseless shape of said tube, the upstream corner edge of said sizing disk having a sharp angular cross section, introducing a fluid under pressure through said mandrel, through said mandrel extension and outwardly from the axis of said mandrel extension into said recess to diffuse said fluid and to expand and cool said tube and to maintain said tube spaced from said mandrel extension, maintaining a fluid tight seal between said moving polymeric tube and said sizing disk, introducing a fluid under pressure through said mandrel, through said mandrel extension, through said sizing disk into the space between said sizing disk, said stabilizing disk and said polymeric tube, independently regulating fluid pressure in the space between said annular opening, said sizing disk and said polymeric tube and in the space between said sizing disk, said stabilizing disk and said polymeric tube at different pressures, and pulling said tube in a pulling zone downstream of said stabilizing disk without twisting said tube while maintaining at least one opening within the interior of said tube extending along the length of said tube throughout said pulling zone and while maintaining said tube free of creases throughout said pulling zone.

13. A process for the fabrication of a creaseless, pliable, thin-walled tube according to claim 12 including deflecting said fluid as it is introduced outwardly from the axis of said mandrel extension and before it impacts said tube.

14. A process for the fabrication of a creaseless, pliable, thin-walled tube according to claim 12 comprising cooling said sizing disk.

* * * * *